United States Patent [19]

Sweeney, Jr.

[11] 3,917,931
[45] Nov. 4, 1975

[54] MEANS AND METHOD FOR CONTROLLING AN ABSORBER SYSTEM

[75] Inventor: Donald E. Sweeney, Jr., Beaumont, Tex.

[73] Assignee: Texaco Inc., New York, N.Y.

[22] Filed: May 3, 1974

[21] Appl. No.: 461,061

[52] U.S. Cl. ............... 235/151.12; 55/18; 196/132; 235/150.1
[51] Int. Cl.² .................... G06F 15/46; B01D 55/00
[58] Field of Search .................... 235/151.12, 150.1; 55/18–21; 202/160; 196/132

[56] References Cited
UNITED STATES PATENTS

| | | | |
|---|---|---|---|
| 3,540,188 | 11/1970 | Barrere et al. | 55/20 |
| 3,703,068 | 11/1972 | Wagner | 55/21 |
| 3,728,527 | 4/1973 | Hopkins et al. | 235/151.12 |
| 3,760,168 | 9/1973 | Boyd | 235/151.12 |
| 3,778,603 | 12/1973 | Sweeney | 235/151.12 |
| 3,781,533 | 12/1973 | Barnstone et al. | 235/151.12 |
| 3,838,256 | 9/1974 | Mosler | 235/151.12 |

Primary Examiner—Felix D. Gruber
Attorney, Agent, or Firm—T. H. Whaley; C. G. Ries; Ronald G. Gillespie

[57] ABSTRACT

A control system controls an absorber system having two or more absorbers to achieve an optimum operating condition. The components of feed solvent, effluent gas and feed gas to and from the absorbers are identified by type and quantity. The control system then computes profits based on the relationship of the various components to each other for each combination of quantity of different components. A first profit is stored along with the values of the absorber system parameters associated with that profit. Subsequent profits are calculated for differcombinations. Each calculated profit is compared with the stored profit. When a calculated profit is greater than a stored profit, the calculated profit is stored along with the values of the absorber system parameters associated with it. The process continues until a cycle of operation has been completed at which time the stored profit is the maximum profit and the stored values are the values of the absorber system parameter necessary to achieve the maximum profit. The control system controls the feed solvent and the feed gas in accordance with the stored values of the absorber system parameters.

14 Claims, 13 Drawing Figures

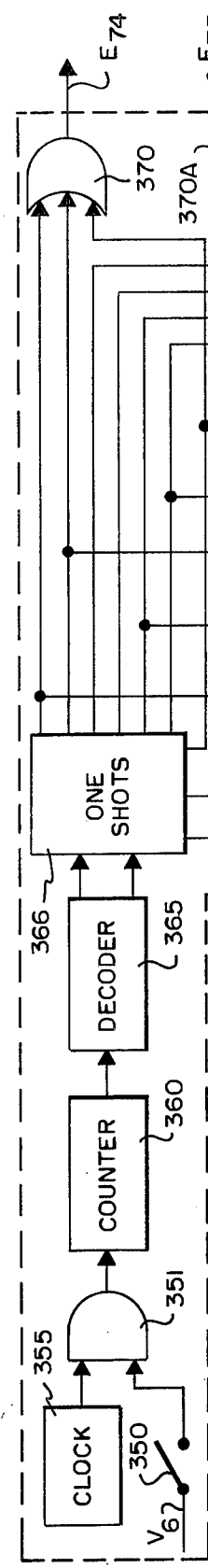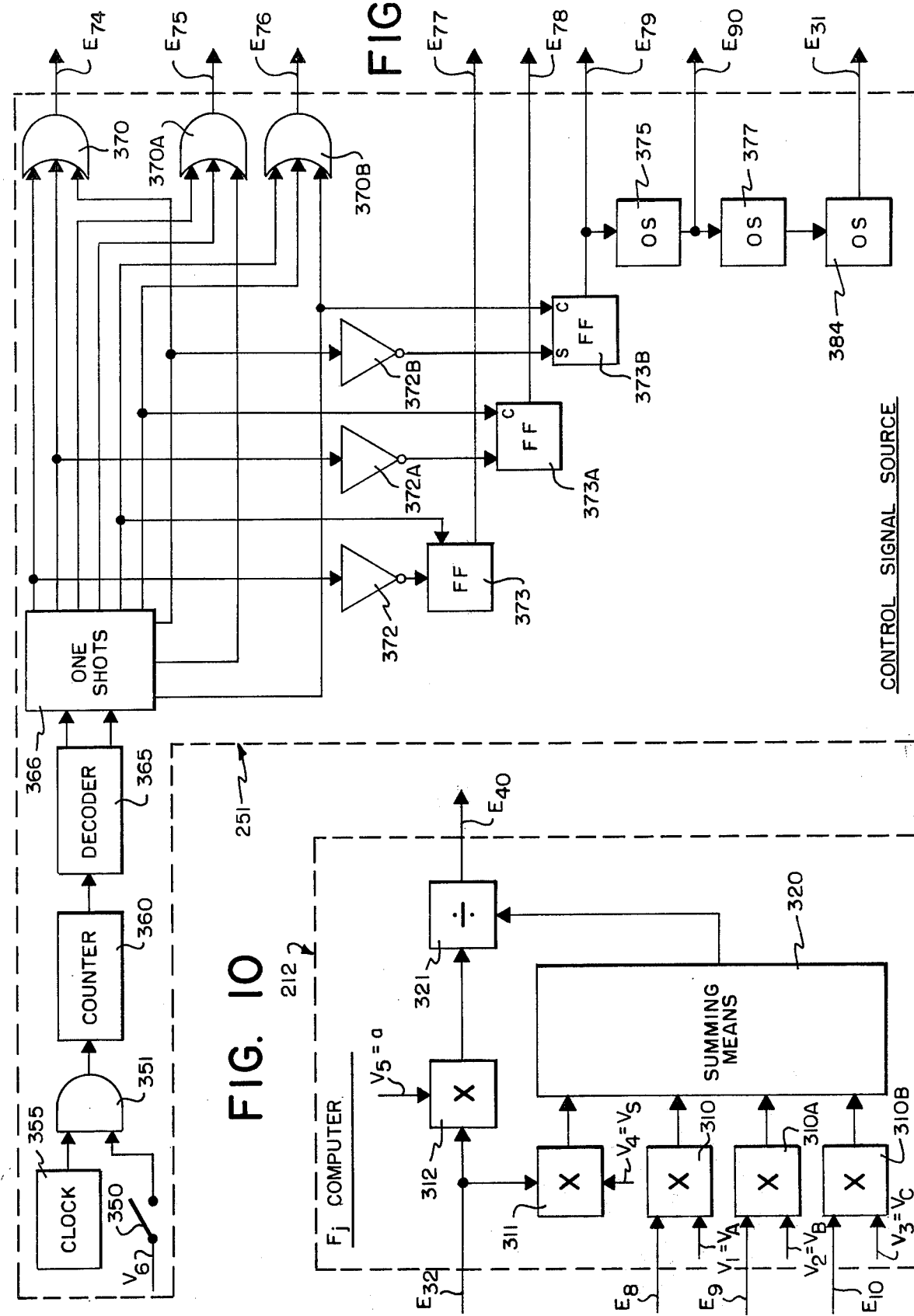
FIG. 11
FIG. 10

MEANS AND METHOD FOR CONTROLLING AN ABSORBER SYSTEM

BACKGROUND OF THE INVENTION

1. Field of the Invention

The system of the present invention relates to control systems in general and, more particularly to a control system for an absorber system.

2. Summary of the Invention

A control system controls an absorber system having two or more absorbers to achieve an optimum operating condition. Each absorber receives feed gas and feed solvent and provides effluent gas and effluent solvent. A monitoring circuit monitors the feed solvents, the feed gases and the effluent gases and provides signals corresponding to the amounts of components in the feed solvent, the amounts of the components in the effluent gas and the amounts of the components in the feed gas. The monitor networks also provide signals corresponding to the flow rates of the feed solvents, of the feed gases and of the effluent gases. Apparatus controls the flow rates of the feed solvent and the feed gas to each absorber and of the effluent gas from the absorber in accordance with the control signals. A signal source provides signals corresponding to the economic values of the components. A network develops the control signals which are applied to the apparatus in accordance with the economic value signals and the signals the network receives from the monitoring circuit so as to control the apparatus in a manner to control the absorber system to operate at an optimum condition.

The object and advantages of the invention will appear more fully hereinafter, from a consideration of the detailed description which follows, taken together with the accompanying drawings wherein one embodiment is illustrated by way of example. It is to be expressly understood, however, that the drawings are for illustrative purposes only are not to be construed as defining the limits of the invention.

DESCRIPTION OF THE DRAWINGS

FIGS. 10 and 11 are detailed block diagrams of the $F_j$ computer and the control signal source, respectively, shown in FIG. 4.

DESCRIPTION OF THE INVENTION

Figure 1:
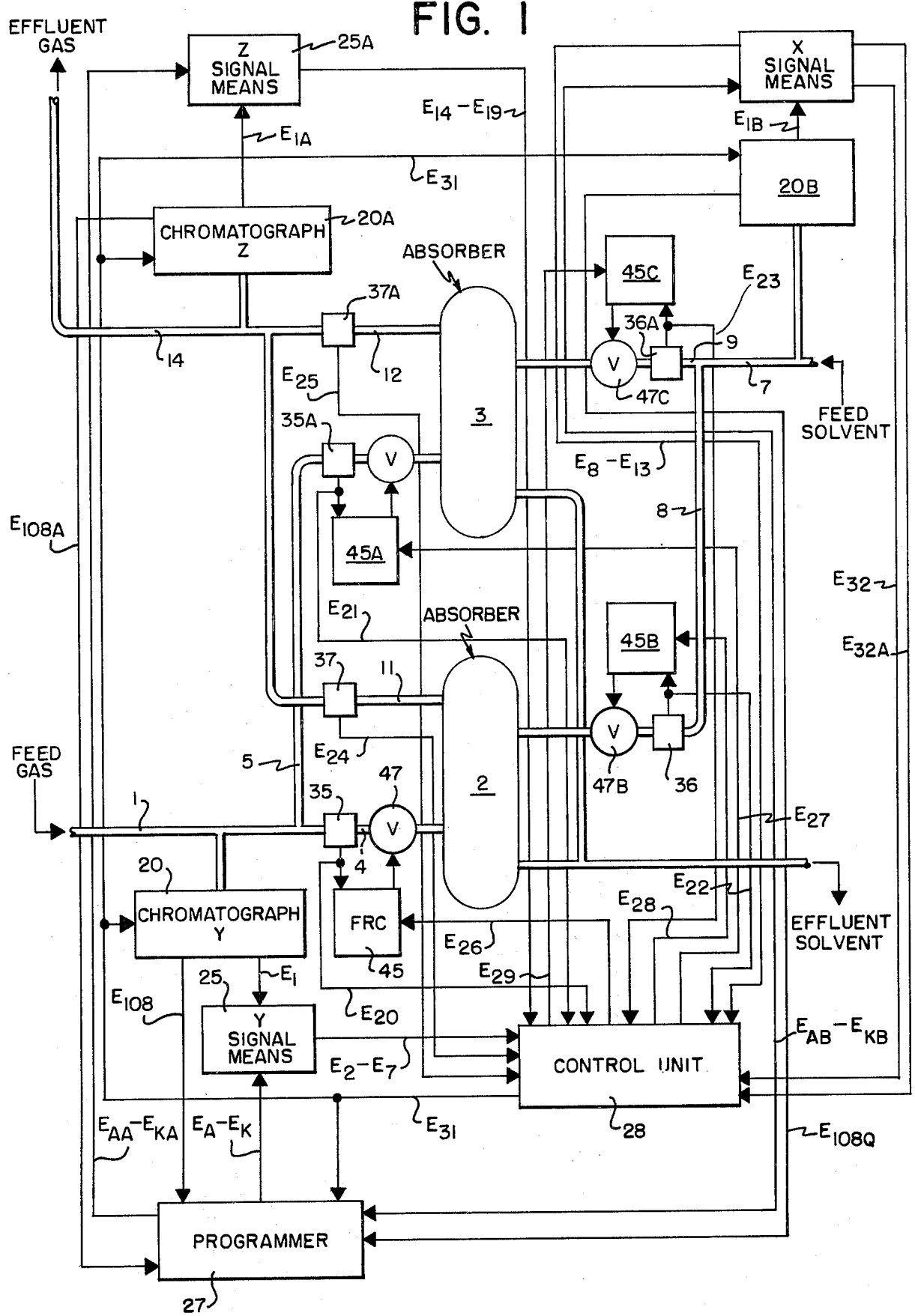
FIG. 1 shows a simplified block diagram of a control system, constructed in accordance with the present invention, for controlling an absorber system which is also shown in partial schematic form.

In large-scale processes where valuable components are removed from a gas stream by absorption with a suitable liquid, there are several absorbers operated in parallel. Each absorber receives a portion of the component-rich feed and contacts the received feed gas with a portion of the solvent which absorbs some of the components from the feed gas. The component-rich solvents are processed downstream to remove the absorbed components.

Since individual absorbers may differ in the efficiency of recovery of the components, it is desirable to have apparatus and a method available to obtain the optimum allocation of component-rich feed gas and feed solvent to each absorber in order to maximize the recovery of absorbed components.

A generalized equation, see equation 1 hereinafter set forth, had been developed in the industry for absorption of an $i^{th}$ component in a $j^{th}$ absorber. Equation 1 is contained in a book, at page 197, entitled "Absorption and Extraction" by T. K. Sherwood and R. L. Pigford and published in 1952 by the McGraw-Hill Book Company, Inc. Control apparatus, method and equations were derived from equation 1 to achieve the optimum control system of the present invention.

The following terms and definitions are necessary to the understanding of the equations and the present invention.

| Term | Definition |
|---|---|
| a | Volume-time conversion constant |
| $D_i$ | Economic value of component i |
| $F_j$ | Molar conversion factor for absorber j |
| $G_j$ | Moles' feed gas to absorber j/unit time |
| $H_j$ | Moles effluent gas from absorber j/unit time |
| $L_j$ | Moles component-free solvent to absorber j/unit time |
| $m_{ij}$ | Equilibrium slope for component i in absorber j |
| $N_j$ | Number of theoretical plates for absorber j |
| P | Total economic value |
| $R_j$ | Vol. flow of feed solvent to absorber/unit time |
| $s_j$ | % Mole fraction of component-free solvent in the solvent to absorber j |
| $V_s$ | Molar volume of component-free solvent, volume units/time |
| $V_i$ | Molar volume of component i, volume units/mole |
| $X_{ij}$ | Moles component i in feed solvent to absorber j/ moles component-free solvent to absorber j |
| $x_{ij}$ | Moles component i in the feed solvent to absorber j |
| $Y_{ij}$ | Moles component i in feed gas to absorber j/mole component-free solvent to absorber j |
| $Z_{ij}$ | Moles component i in effluent gas from absorber j/ mole feed gas to absorber j |
| $z_{ij}$ | Mole fraction of component i in effluent gas from absorber j |

$$\frac{Y_{ij} - Z_{ij}}{Y_{ij} - m_{ij}X_{ij}} = \frac{(L_j/m_{ij}G_j)^{N_j+1} - (L_j/m_{ij}G_j)}{(L_j/m_{ij}G_j)^{N_j+1} - 1} \qquad 1.$$

where $X_{ij}$ is defined by an equation 2.

$$X_{ij} = \frac{x_{ij}}{s_j} \qquad 2.$$

The term $Z_{ij}$ is obtained from equation 3, $$Z_{ij} = \frac{z_{ij}H_j}{G_j}, \qquad 3.$$

while the term $L_j$ is obtained from equation 4.

$$L_j = R_jF_j. \qquad 4.$$

The term $F_j$ is defined by equation 5.

$$F_j = \frac{as_j}{s_jV_s = \sum_{i=1}^{I}(x_iV_i)} \qquad 5.$$

All of the values for equation 2 through 5 may be obtained from measured parameters, the only remaining term is $m_{ij}$ which may be determined by rearranging equation 1 to provide equation 6.

$$m_{ij} = \left[ \frac{Y_{ij}\left(\frac{L_j}{G_j}\right)\left(m_{ij}\right)^{N_j} + X_{ij}\left(\frac{L_j}{G_j}\right)^{N_j+1}(m_{ij}) - Z_{ij}\left(\frac{L_j}{G_j}\right)^{N_j+1}}{Y_{ij} + X_{ij}\left(\frac{L_j}{G_j}\right) - Z_{ij}} \right]^{\frac{1}{N_j+1}} \quad 6.$$

A profit associated with the component $i$ may be determined from equation 7 which in effect states that the total profit P is the sum of all of the profits associated with each of the components absorbed. Thus $D_i$ is a value of the $i^{th}$ components, $G_i$ is effectively the flow rate of the $i^{th}$ component being provided to an absorber, while $(Y_{ij}-Z_{ij})$ is the portion of the $i^{th}$ component being absorbed.

$$P = \sum_{j=1}^{J} \sum_{i=i}^{I} D_i G_j (Y_{ij} - Z_{ij}) \quad 7.$$

Equation 7 may be rewritten by solving equation 1 for $Y_{ij}-Z_{ij}$ and substituting in equation 7 to yield equation $$P = \sum_{j=1}^{J} \sum_{i=1}^{I} D_i G_j (Y_{ij} - m_{ij} X_{ij}) \left[ \frac{(L_j/m_{ij}G_j)^{N_j+1} - (L_j/m_{ij}G_j)}{(L_j/m_{ij}G_j)^{N_j+1} - 1} \right] \quad 8.$$

A total flow rate of component-free solvent to the absorbers may be obtained by summing the individual flow rates of component free solvent as is done in equation 9.

$$L_T = \sum_{j=1}^{J} L_j \quad 9.$$

Similarly the total flow rate of feed gas to the absorbers may be obtained by summing the individual flow rates of feed gas as is done in equation 10.

$$G_T = \sum_{j=1}^{J} G_j \quad 10.$$

A new flow rate of component-free solvent to an absorber $k$ may be obtained by adding a predetermined allowable change $\Delta L_k$ in the component-free solvent flow rate to absorber $k$ as shown in equation 11.

$$L'_k = L_k + \Delta L_k \quad 11.$$

The individual flow rates of component free-solvent to the other absorbers may be determined from equation $$L_j' = \frac{L_T - L_k'}{L_T - L_k} L_j \quad 12.$$

Each value for $L'_k$ may then be compared with reference values corresponding to limits on the individual component-free solvent to the corresponding absorbers to assure that the conditions of inequality 13 are being met.

$$L_{l,k} < L'_k < L_{u,k} \quad 13.$$

If the conditions of inequality 13 are not being met, a new value for $L'_k$ is determined from equation 14 and $L'_j$ are recalculated. Again the limiting conditions must be met.

$$L'_k = L_k - \Delta L_k \quad 14.$$

Similarly, new flow rates for the feed gas are determined using equations 15 through 19.

$$G'_k = G_k + \Delta G_k \quad 15.$$

$$G_j' = \frac{G_T - G_k'}{G_T - G_k} G_j \quad 16.$$

$$G_{l,k} < G'_k < G_{u,k} \quad 17.$$
$$G''_k = G_k - \Delta G_k \quad 18.$$

When new values for $L'_j$ and $G'_j$ are determined, a new total profit is computed. If the new total profit is greater than the previous total profit, the values for $L'_j$ and $G'_j$ are stored. A new flow rate $R'_j$ for each feed solvent is determined using equation 19.

$$R_j' = \frac{L'_j}{F_j} \quad 19.$$

The stored values for the feed solvent flow rates and the feed gas flow rates associated with the stored total profit is impressed on the absorption system.

It is obvious the foregoing general equations yield complex apparatus due to the different combinations of $i$ components and $j$ absorbers. Therefore, in explaining the present invention, a two absorber system absorbing three components will be described.

Referring to FIG. 1, there is shown a two-absorber arrangement for the treatment of feed gas entering a line 1 and which is provided to absorbers 2, 3 by way of lines 4 and 5, respectively. Feed solvent entering a line 7 is applied to absorbers 2, 3 by way of lines 8 and 9, respectively. Absorbers 2 and 3 provide effluent gas by way of lines 11 and 12 to a common output line 14.

It should be noted that as a matter of convenience absorbers 2, 3 were shown with common feed gas, feed solvent and effluent gas lines while the arrangement set forth in the equation provides for separate feed gas, feed solvent and effluent gas lines for each absorber. Therefore in the equations for example where there is a particular component of feed gas for absorber 2 and that component for absorber 3, in actuality in the following example it would be generated by one signal within the chromatograph means. For ease of understanding, through, it will be separated into two signals in the chromatograph means.

Chromatograph means 20 samples feed gas in line 1 and provides a signal $E_1$ corresponding to the analysis to Y signal means 25. Y signal means 25 receives control pulses $E_A$ through $E_K$ and provides signals $E_2$ through $E_7$ corresponding to the terms $Y_{A1}$, $Y_{B1}$, $Y_{C1}$, $Y_{A2}$, $Y_{B2}$, $Y_{C2}$ through a control unit 28. Chromatograph 20 also provides a pulse signal $E_{108}$ to chromatograph programmer 27. Each pulse in signal $E_{108}$ corresponds to a peak in signal $E_1$.

Programmer 27 also provides control pulses $E_{AA}$ through $E_{KA}$ to Z signal means 25A. All elements identified by a number having a letter suffix similar to and operate in a similar manner as elements having the same numeric designation without the suffix.

A chromatograph 20A samples the effluent gas in line 14 and provides a corresponding signal $E_{1A}$ to Z signal means 25A and a pulse signal $E_{108A}$ to programmer 27. Signal means 25A receives control pulses $E_{AA}$ through $E_{KA}$ from programmer 27 and provides signals $E_{14}$ through $E_{19}$, corresponding to $z_{A1}$, $z_{B1}$, $z_{C1}$, $z_{A2}$, $z_{B2}$ and $z_{C2}$ to control unit 28.

A chromatograph 20B samples the feed solvent in line 7 and provides a signal $E_{1B}$ corresponding to the analysis to X signal means 25B and a pulse signal $E_{108B}$ to programmer 27. Signal means 25B receives control pulses $E_{AB}$ through $E_{KB}$ from programmer 27 and provides signals $E_8$ through $E_{13}$ corresponding to $x_{A1}$, $x_{B1}$, $x_{C1}$, $x_{A2}$, $x_{B2}$ and $x_{C2}$ to control unit 28.

Flow rate sensors 35, 35A sensing the flow rates of the feed gas in lines 4 and 5, respectively; flow rate sensors 36, 36A sensing the flow rates of the feed solvent in lines 8 and 9, respectively, and flow rate sensors 37, 37A sensing the flow rates of the effluent gas in lines 11 and 12, respectively, provide signals $E_{20}$ through $E_{25}$, respectively.

Controllers 45 through 45C, respectively, provide signals to valves 47 through 47C, respectively, in lines 4, 5, 8 and 9, respectively, to control the flow rates of the feed gas and feed solvent to absorbers 2, 3. Control unit 28 provides signals $E_{26}$ through $E_{29}$ to flow recorder controllers 45 through 45C respectively to adjust the set points of those controllers in accordance with the determination of the flow rates for an optimum operating condition as hereinafter described.

Figure 2:
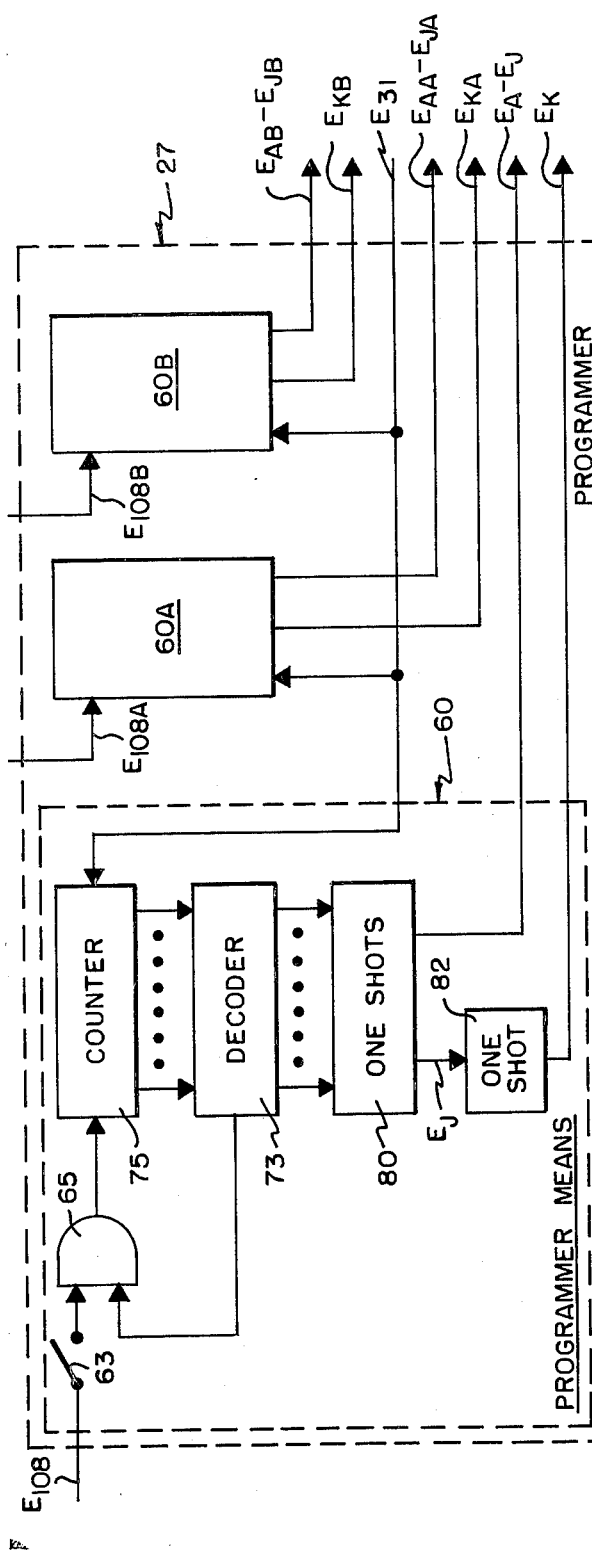
FIGS. 2, 3 and 4 are detailed block diagrams of the programmer, the signal means and the control unit, respectively, shown in FIG. 1.

Referring to FIGS. 1 and 2, programmer 27 includes programmer means 60, 60A and 60B receiving signals $E_{108}$, $E_{108A}$ and $E_{108B}$, respectively, provide the control signals $E_A$ through $E_K$, $E_{AA}$ through $E_{AK}$, and $E_{BA}$ through $E_{BK}$. Signal $E_{108}$ is applied to a single pole, single throw switch 63, which when activated passes signal $E_{108}$ to an AND gate 65. It should be noted that switch 63 which is also in programmer means 60A and 60B, would in effect be activated simultaneously with the activation of switch 63 in programmer means 60, so that signals $E_{108}$, $E_{108A}$ and $E_{108B}$ are simultaneously applied to AND gates in their respective programmer means.

AND gate 65 receives an enabling direct current voltage from a decoder 73 in programmer means 60. AND gate 65 passes pulses $E_8$ when enabled to a counter 75. The count in counter 75 is decoded by decoder 73. When the number of pulses passed by AND gate 65 corresponds to the number of peaks desired to be analyzed decoder 73 provides a low-level direct current voltage to AND gate 65, thereby disabling it so as to stop the counting processes. Decoder 73 also provides a plurality of outputs to a plurality of one-shot multivibrators 80 which are triggered to provide control pulses $E_A$ through $E_K$. Each control pulse $E_A$ through $E_J$ coincides with a peak of signal $E_1$. Pulse $E_J$ also triggers another one-shot multivibrator 82 which provides control $E_K$.

A reset pulse $E_{31}$ from control unit 28 resets counters 75 in programming means 60, 60A and 60B. Pulse $E_{31}$ is also applied to chromatographs 20, 20A and 20B to reset those chromatographs.

Figure 3:
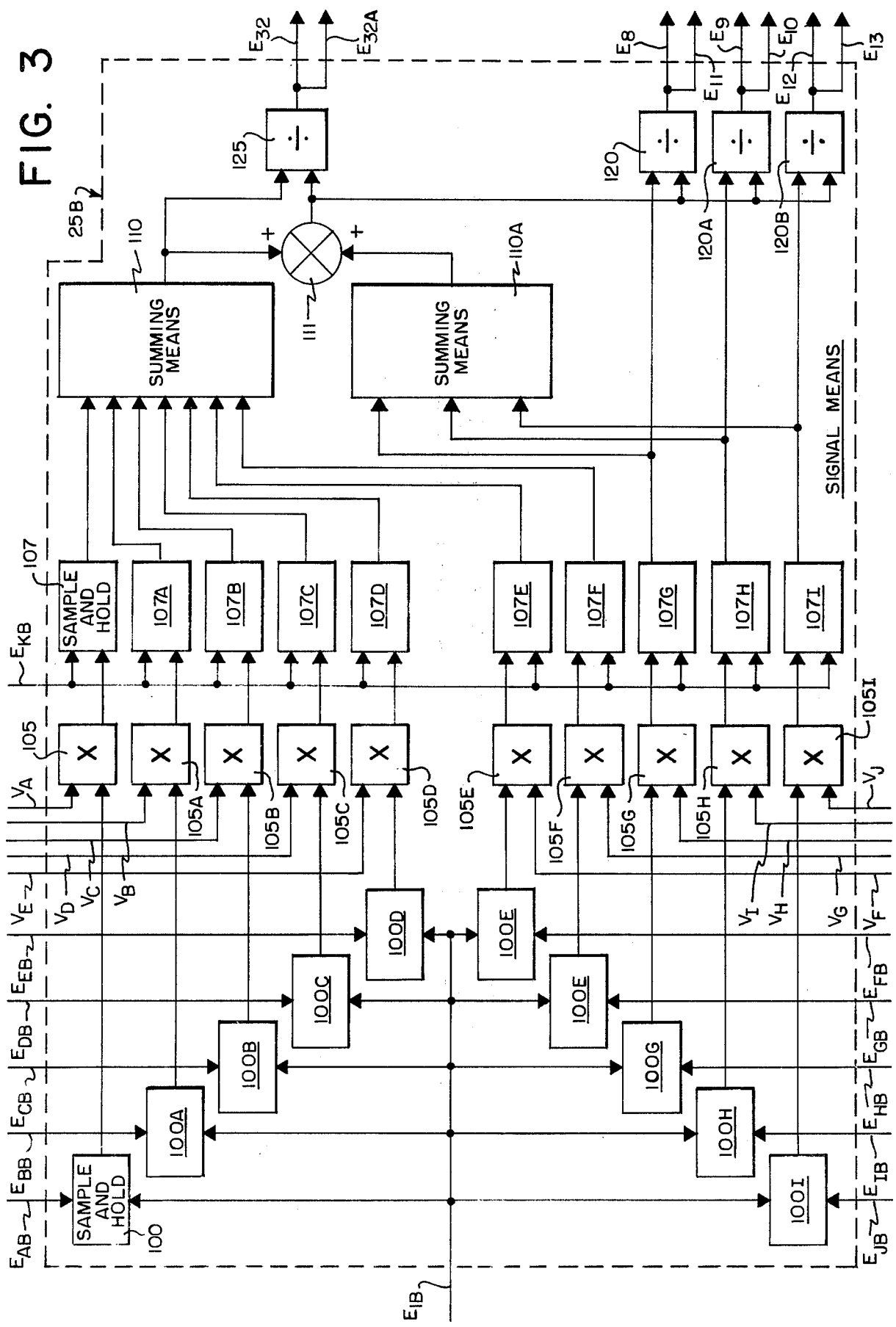

Referring now to FIGS. 1, 2 and 3, the details and operation of signal means 25B will be discussed since it is more complex than signal means 25 and 25A. The difference between the three signal means will be described hereinafter. The peaks of signal $E_{1B}$ from chromatograph means 20B corresponds to the different constituents of the feed solvent in line 7. Sample and hold circuits 100-100I are controlled by both signals $E_{AB}$ through $E_{JB}$ to hold the different peaks of signal $E_{1B}$. The following table relates a particular sample hold circuit to a corresponding constituent.

| CIRCUIT | CONSTITUENT | CIRCUIT | CONSTITUENT |
| --- | --- | --- | --- |
| 100I | Ethane | 100D | Normal Pentane |
| 100H | Propane | 100C | Propylene |
| 100G | Iso-Butane | 100B | Butylenes |
| 100F | Normal Butane | 100A | Pentylenes |
| 100E | Iso-Pentane | 100 | All olefinic compounds with 6 or more carbon atoms |

The outputs from sample hold circuits 100–100I are applied to multipliers 105 through 105I, respectively, where they are multiplied with direct current voltages $V_A$ through $V_J$, respectively, corresponding to the various chromatograph 20B scaling factors pertaining to the particular constituents. By way of example, the voltages $V_A$ through $V_J$ may correspond to 0.02, 0.2, 1.0, 0.2, 0.15, 0.02, 0.2, 0.10, 0.02 and 0.10 volts, respectively. The product signals from multipliers 105 through 105I are sampled and held by circuits 107 through 107I, respectively, in response to pulse signal $E_K$, programmer 27. Sample and hold circuits 107 through 107I are used so that the outputs corresponding to the various constituents of the feed solvent may be presented simultaneously to summing means 110 and 110A, as hereinafter explained. Summing means 110 receives the signals from sample and hold circuits 107 through 107F while summing means 110A receives signals from sample and hold circuits 107G through 107I. The outputs of summing means 110, 110A are summed by summing means 111 to provide a signal for use in normalizing the signals from sample and hold circuits 107G, 107H and 107I. Dividers 120 through 120B divide the signals from sample and hold circuits 107G, 107H and 107I, respectively, with the signal from summing means 111 to provide signals $E_8$ and $E_{11}$, $E_9$ and $E_{12}$, $E_{10}$ and $E_{13}$, respectively. The signals from dividers 120, 120A, 120B were divided into two separate signals for ease of explaining the inventive concept, as noted earlier the equations provide for analysis of separate feed solvent to each absorber. Since there is a common feed solvent it is not necessary that the six signals be shown, but in keeping with the equation, it is more illustrative to show them as separate signals.

A divider 125 divides the signals from summing means 110 by the signal from the summing means 111 to provide signals $E_{32}$, $E_{32A}$ corresponding to the terms which is the percent of the component free solvent.

Signal means 25 and 25A are similar to signal means 25B except that summing means 110, 110A and 111 would be combined into one summing means. Control pulses $E_A$ through $E_K$ would have the same function as control pulses $E_{AB}$ through $E_{KB}$. The same is also true for signal means 25A where control pulses $E_{AA}$ through $E_{KA}$ have the same functions as control pulses $E_{AB}$ through $E_{KB}$.

Figure 4:
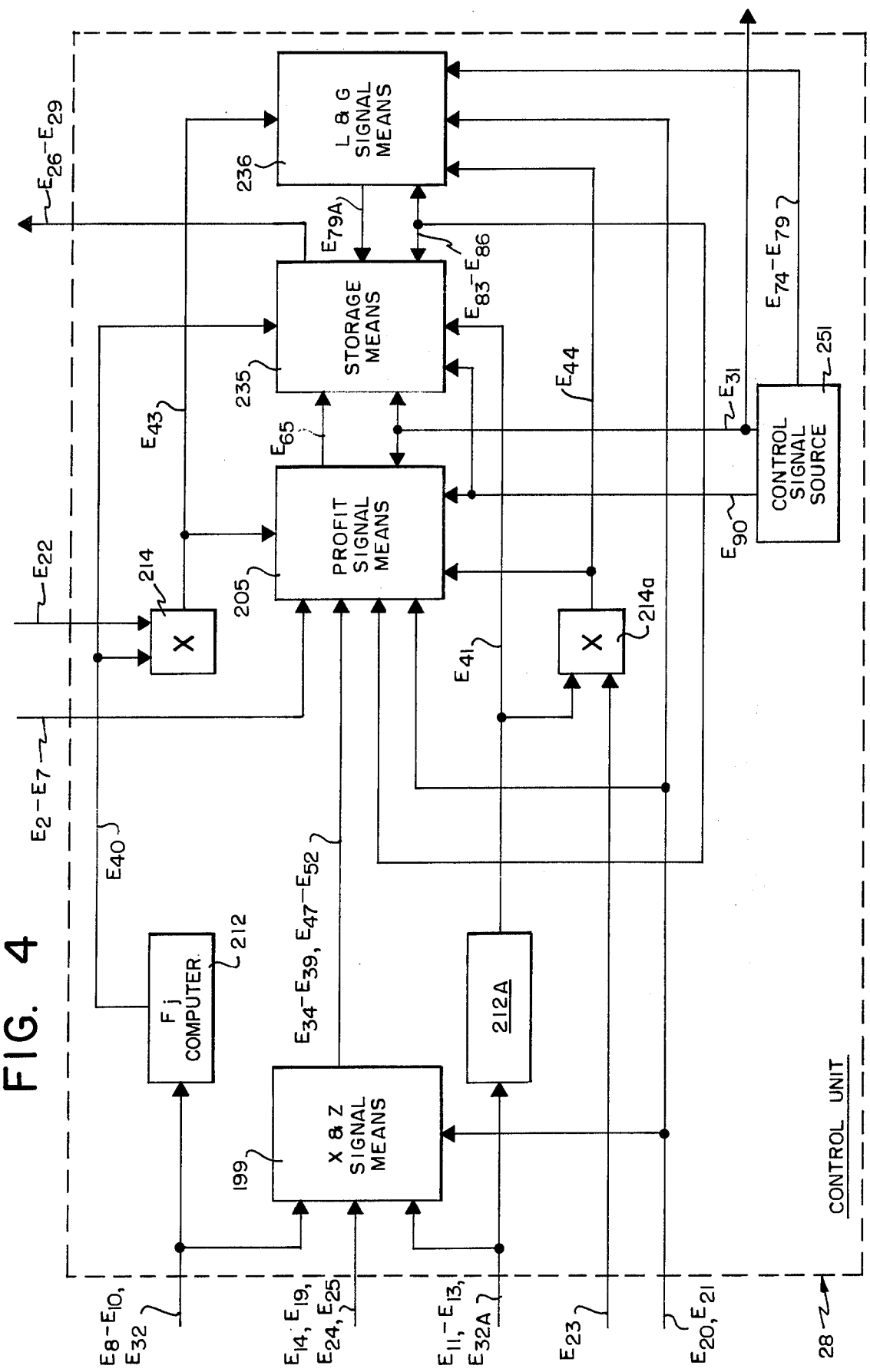
Figure 5:
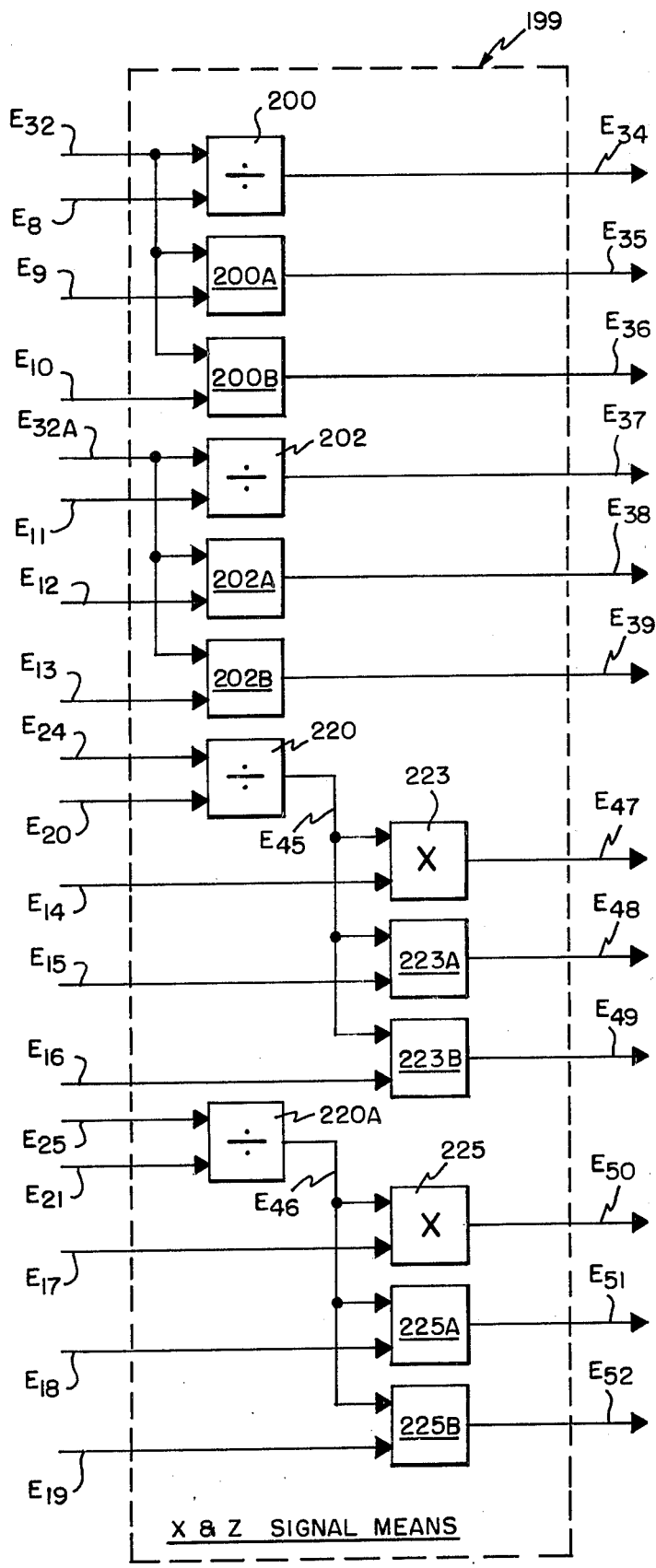
FIGS. 5, 6, 7 and 8 are detailed block diagrams of the X and Z signal means, the profit signal means, the storage means and the L and G signal means, respectively, shown in FIG. 4.

Referring now to FIGS. 1, 4 and 5, control unit 28 includes X and Z signal means 199 receiving signals $E_8$ through $E_{19}$, $E_{24}$, $E_{25}$, $E_{32}$ and $E_{32A}$ and provides signals $E_{34}$ through $E_{39}$ and $E_{47}$ through $E_{52}$. X and Z signals means 199 includes dividers 200, 200A and 200B which divide signals $E_8$, $E_9$ and $E_{10}$, respectively, from signal means 25B with signal $E_{32}$ from signal means 25B to provide signals $E_{34}$, $E_{35}$ and $E_{36}$ corresponding to the terms $X_{A1}$, $X_{B1}$ and $X_{C1}$ in the foregoing equations. Similarly dividers 202, 202A and 202B divide signals $E_{11}$, $E_{12}$ and $E_{13}$ by signal $E_{32A}$ to provide signals $E_{37}$, $E_{38}$ and $E_{39}$, respectively.

Dividers 220, 220A divide signals $E_{24}$ and $E_{25}$, respectively, corresponding to the terms $H_1$ and $H_2$ respectively with signals $E_{20}$ and $E_{21}$, respectively, corresponding to the terms $G_1$ and $G_2$. The terms $H_1$ and $H_2$ are noted in the general equations as $H_j$ and while the terms $G_1$ and $G_2$ are noted as $G_j$. Divider 220 and 220A provide signals $E_{45}$ and $E_{46}$ respectively. Signal $E_{45}$ is multiplied with signals $E_{14}$, $E_{15}$ and $E_{16}$ by multipliers 223, 223A and 223B, respectively, to provide signals $E_{47}$, $E_{48}$ and $E_{49}$, respectively, corresponding to the particular terms $Z_{A1}$, $Z_{B1}$ and $Z_{C1}$, respectively. Similarly multipliers 225, 225A and 225B multiply signal $E_{46}$ with signals $E_{17}$, $E_{18}$ and $E_{19}$, respectively, to provide signals $E_{50}$, $E_{51}$ and $E_{52}$ respectively. Signals $E_{50}$, $E_{51}$ and $E_{52}$ correspond to the particular terms $Z_{A2}$, $Z_{B2}$ and $Z_{C2}$.

Referring to FIGS. 1 and 4, signals $E_8$ through $E_{10}$ and $E_{32}$ are provided to an $F_j$ computer 212 in control unit 28 while signals $E_{11}$ through $E_{13}$ and $E_{32A}$ are provided to another $F_j$ computer 212A. Computers 212 and 212A provide signals $E_{40}$, $E_{41}$ corresponding to the molar conversion factors $F_1$ and $F_2$, respectively, for absorbers 2 and 3, respectively. Factors $F_1$, $F_2$ are denoted in the aforementioned equations by the general expression $F_j$. Multipliers 214 and 214A multiply the signals $E_{40}$ and $E_{41}$ with signals $E_{22}$ and $E_{23}$ respectively to provide signals $E_{43}$ and $E_{44}$ corresponding to the term $L_1$ and $L_2$ respectively which is represented by the term $L_j$ and a generalized form of the equations.

Figure 6:
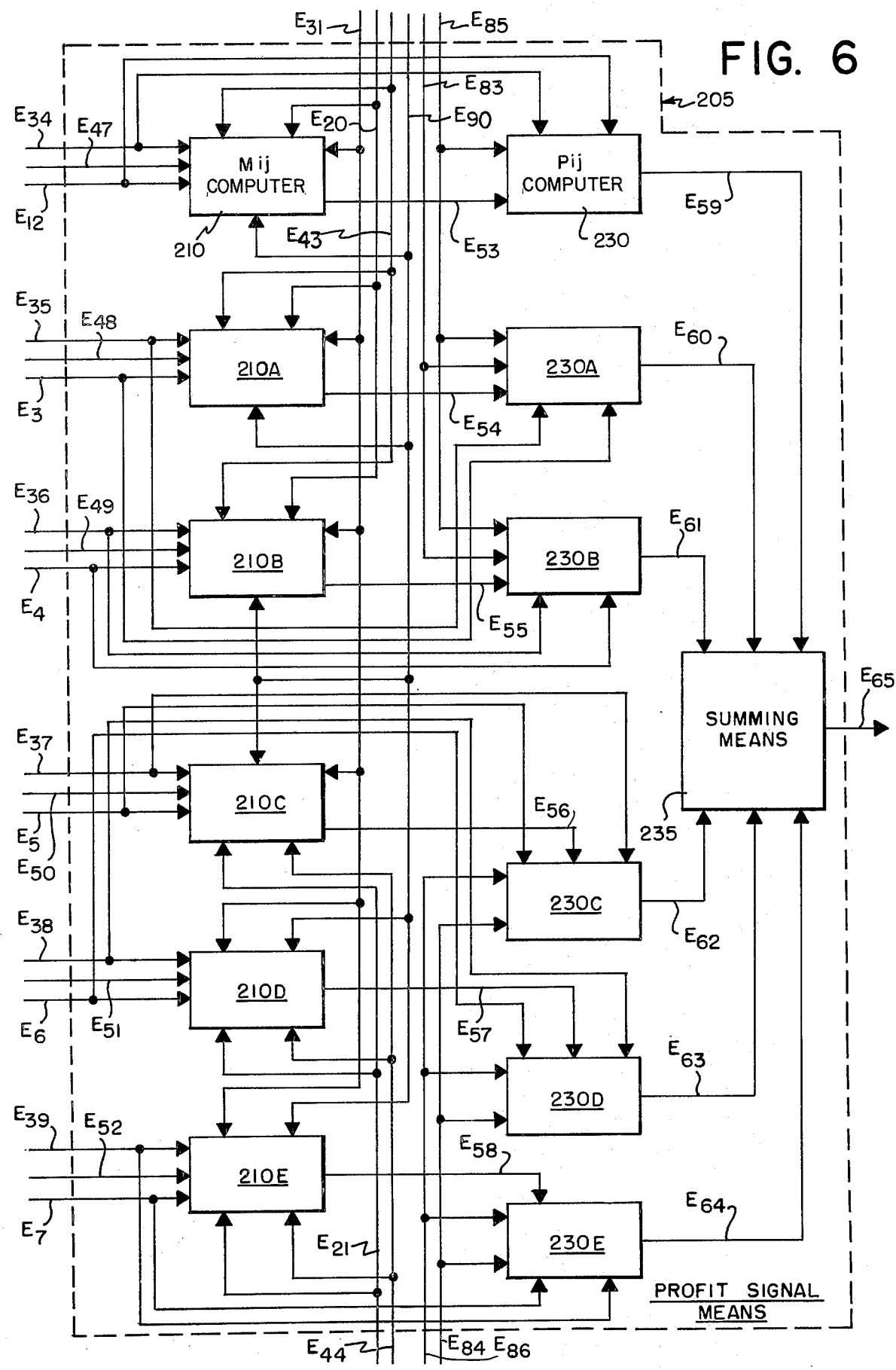

Referring to FIGS. 1, 4 and 6, control unit 28 includes profit signal means 205 providing a signal $E_{65}$ corresponding to a calculated profit as hereinafter explained. Profit signal means 205 receives signals $E_2$ through $E_7$, $E_{20}$, $E_{21}$, $E_{34}$ through $E_{39}$, $E_{43}$, $E_{44}$, $E_{47}$ through $E_{52}$, $E_{83}$ through $E_{86}$, $E_{97}$ and $E_{31}$. Profit signals means 205 includes $m_{ij}$ computers 210 through 210E, respectively, which provide signals $E_{53}$ through $E_{58}$, respectively, corresponding to individual terms $M_{A1}$, $M_{B1}$, $M_{C1}$, $M_{A2}$, $M_{B2}$, $M_{C2}$, respectively, as hereinafter explained. The following table shows the signals each $m_{ij}$ computer receives:

| $m_{ij}$ Computer | Receives signals |
| --- | --- |
| 210 | $E_2$, $E_{20}$, $E_{34}$, $E_{43}$, $E_{47}$, $E_{31}$ $E_{90}$ |
| 210A | $E_3$, $E_{20}$, $E_{35}$, $E_{43}$, $E_{48}$, $E_{31}$ " |
| 210B | $E_4$, $E_{20}$, $E_{36}$, $E_{43}$, $E_{49}$, $E_{31}$ " |
| 210C | $E_5$, $E_{21}$, $E_{37}$, $E_{44}$, $E_{50}$, $E_{31}$ " |
| 210D | $E_6$, $E_{21}$, $E_{38}$, $E_{44}$, $E_{51}$, $E_{31}$ " |
| 210E | $E_7$, $E_{21}$, $E_{39}$, $E_{44}$, $E_{52}$, $E_{31}$ " |

Summing means 235 sums signals $E_{59}$ through $E_{64}$ to provide signal $E_{65}$.

Profit signal means 205 also includes $p_{ij}$ computers 250 through 230E providing signals $E_{59}$ through $E_{64}$, respectively, corresponding to the different profits associated with each particular component as hereinafter explained. The following table relates a particular $p_{ij}$ computer to the signals it receives.

| $p_{ij}$ Computer | Receives signals |
| --- | --- |
| 230 | $E_{21}$, $E_{34}$, $E_{53}$, $E_{83}$, $E_{85}$ |
| 230A | $E_{31}$, $E_{35}$, $E_{54}$, $E_{83}$, $E_{85}$ |
| 230B | $E_{41}$, $E_{36}$, $E_{55}$, $E_{83}$, $E_{85}$ |
| 230C | $E_5$, $E_{37}$, $E_{56}$, $E_{84}$, $E_{86}$ |
| 230D | $E_6$, $E_{38}$, $E_{57}$, $E_{84}$, $E_{86}$ |
| 230D | $E_7$, $E_{39}$, $E_{58}$, $E_{84}$, $E_{86}$ |

Summing means 235 sums signals $E_{59}$ through $E_{64}$ to provide signal $E_{65}$.

Control unit 28 also includes storage means 235 receiving signals $E_{20}$, $E_{21}$, $E_{40}$, $E_{41}$, $E_{43}$, $E_{44}$, $E_{67}$, $E_{68}$, $E_{83}$ through $E_{86}$ and $E_{90}$. Signals $E_{83}$ through $E_{86}$ from L' and G' signal means correspond to calculated $L_1'$, $L_2'$, $G_1'$, $G_2'$, respectively. Storage means 235 effectively stores the profit signal $E_{65}$ corresponding to the greatest profit computed as hereinafter explained.

Figure 7:
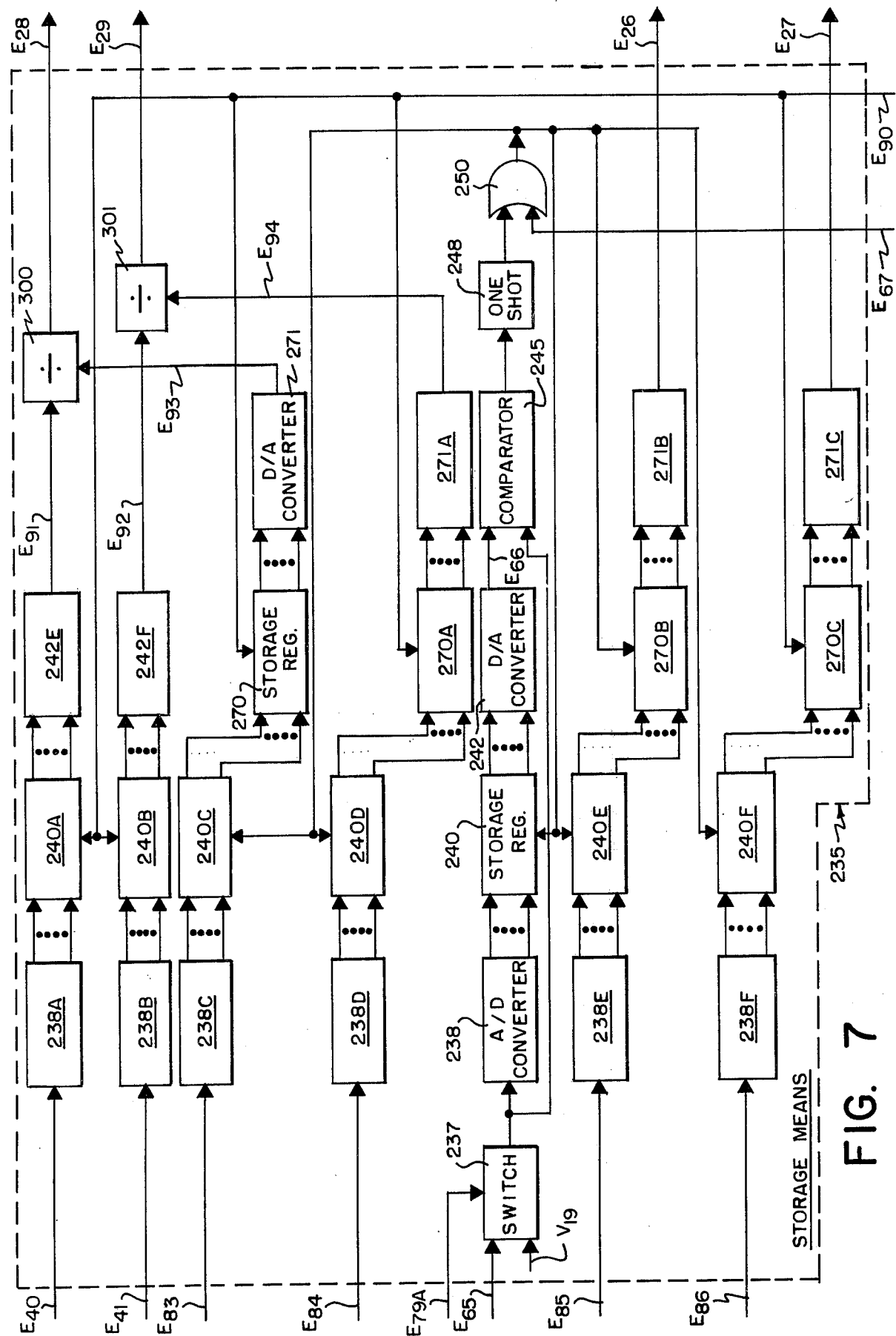

Referring also to FIG. 7, signal $E_{65}$ is applied to an electronic single pole, double throw switch 237 which is controlled by a signal $E_{79A}$ hereinafter described to pass signal $E_{65}$ when L' and G' do not exceed limits as hereinafter explained. When either an $L'_1$ or $G'_1$ does exceed a limit, switch 237 is controlled by signal $E_{79A}$ to block signal $E_{65}$ and pass a direct current voltage $V_{19}$ having substantially a zero amplitude so that stored values of P, $L_1$, $L_2$, $G_1$ and $G_2$ will not be changed by an erroneous signal $E_{65}$.

A passed signal $E_{65}$ is converted to digital signals by a conventional type analog-to-digital converter 238. Said digital signals are applied to a conventional type storage register 240. Storage register 240 provides digital signals corresponding to the stored content to a digital to analog converter 242 which may be of a conventional type and which provides an analog signal $E_{66}$ corresponding to the stored profit value. A comparator 245 compares the stored profit with the current profit signal $E_{65}$. In the initial operation, signal $E_{66}$ corresponds to a zero value, whereas signal $E_{65}$ is at some value greater than zero, so that comparator 245 changes its output from a high level to a low level triggering a one-shot multivibrator 248 to provide a pulse, which passes through an OR gate 250 to storage register 240 causing register 240 to enter the digital signals corresponding to the current profit signal $E_{65}$. A start pulse $E_{31}$ is applied at the beginning of the systems operation through OR gate 250 to storage register 240 to enter the first round of profit. In a normal sequence of operations, signals $E_{83}$, $E_{84}$, $E_{85}$ and $E_{86}$ corresponding to $L'_1$, $L'_2$, $G_1'$ and $G_2'$ change value as hereinafter explained. Computers 230–230E compute profits in accordance with the value changes and signal $E_{65}$ will change accordingly. Signal $E_{65}$ is being continually compared with a stored profit, a comparison is made, and when the current profit is equal to or less than the stored profit, no change is made in the contents of register 240. However, when the current profit exceeds the stored profit, as mentioned before, storage register 240 is controlled by a pulse from one-shot 248 to enter the current profit digital signals from converter 238. After a cycle of steps has been completed the profit stored in register 240 will be a maximum profit for that cycle.

Signals $E_{40}$ and $E_{41}$ are applied to A-D converters 238A and 238B respectively where they are converted to digital signals and applied to storage registers 240A and 240B, respectively. When pulse $E_{90}$ is applied to storage registers 240A and 240B the values for $F_1$ and $F_2$ are entered into storage registers 240A and 240B.

It is necessary that the operating parameters associated with the maximum profit also be available so that it can be used to implement control signals. Thus values for $L'_1$ and $L_2'$ and for $G_1'$ and $G_2'$ which are associated with the stored profit are also stored.

Signals means 236 provides signals $E_{83}$, $E_{84}$, $E_{85}$ and $E_{86}$, corresponding to $L_1'$, $L_2'$, $G_1'$ and $G_2'$, to analog to digital converters 238C, 238D, 238E and 238F, respectively. Converters 238C, 238D, 238E and 238F provide corresponding digital signals to storage registers 240C, 240D, 240E and 240F, respectively. Entry of digital signals into registers 240C, 240D, 240E and 240F is controlled by the same pulse controlling the entry of digital signals into register 240 so that registers 240C, 240D, 240E and 240F store the digital values of $L_1'$, $L_2'$, $G_1'$ and $G_2'$ associated with the profit value stored in register 240.

Figure 8:
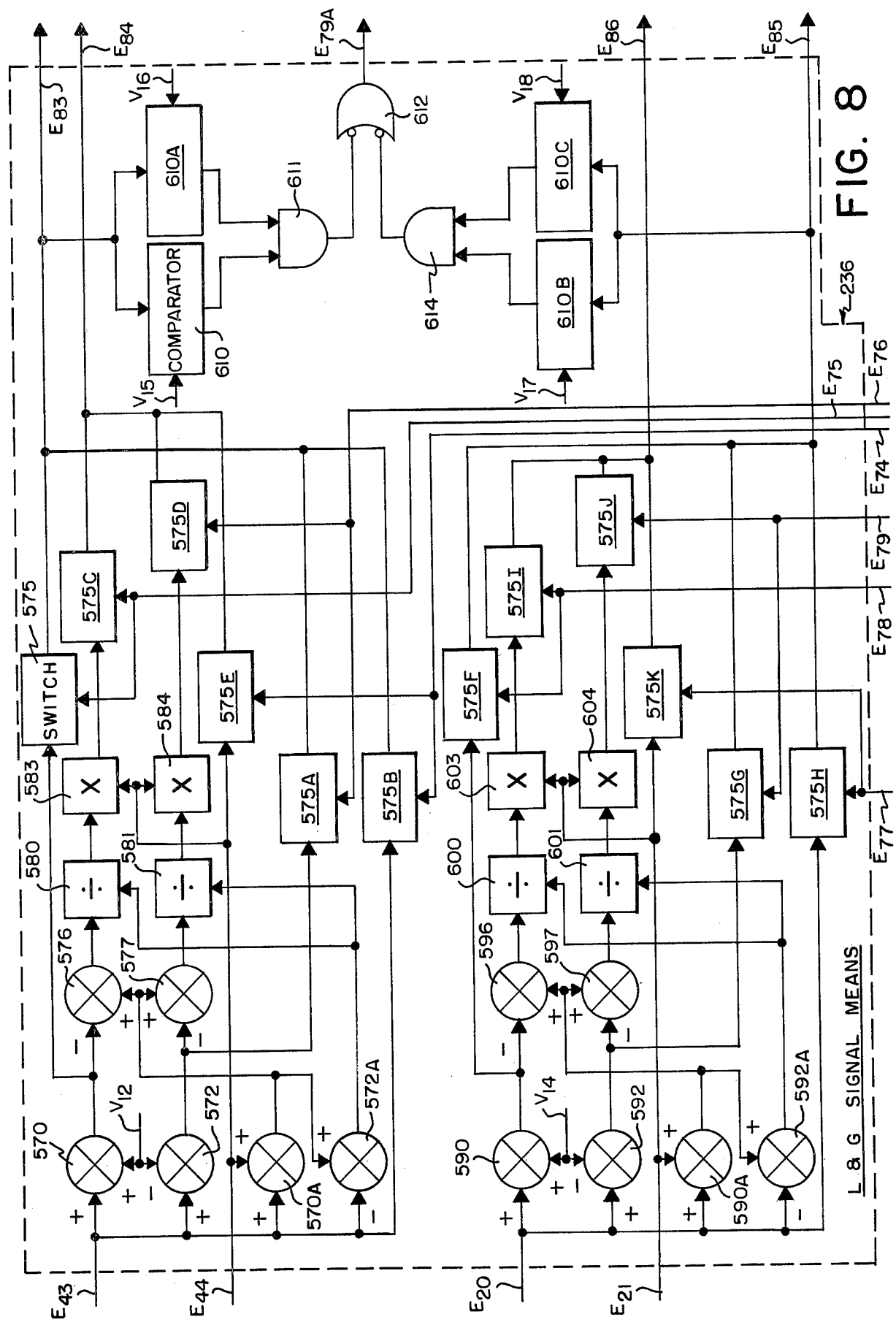

Referring to FIG. 8, L and G signal means 236 will now be described in detail. Signal $E_{43}$, corresponding to the term $L_1$, is applied to summing means 570, 570A and to subtracting means 572 and 572A. Summing means 570 sums signal $E_{43}$ with a direct current voltage $V_{12}$ corresponding to a predetermined change $\Delta L$ in L to provide a signal corresponding to the term $L'_k$ of equation 11, to a switch 575 and to subtracting means 576.

Subtracting means 572 subtracts voltage $V_{12}$ from signal $E_{43}$ to provide a signal, corresponding to the term $L''_k$ of equation 14, to a switch 575A. Signal $E_{43}$ is also provided to a switch 575B so that switches 575, 575A and 575B receive three signals corresponding to three different values $L_1$, $L_1'$ and $L_2''$.

Summing means 570A sums signal $E_{44}$ corresponding to the term $L_2$ with signal $E_{43}$ to provide a signal corresponding to the term $L_T$ to subtracting means 576, 577. Subtracting means 576, 577 subtracts the signals provided by summing means 570 and subtracting means 572, respectively, from the sginal provided by summing means 570A to provide signals to dividers 580 and 581, respectively.

Subtracting means 572A subtracts signal $E_{43}$ from the signal provided by summing means 570A to provide a signal to dividers 580, 581. It should be noted that the operation of summing means 570A and 572A in effect adds signals $E_{43}$ and $E_{44}$ and then subtracts signal $E_{43}$ out, so that it would be possible to use signal $E_{44}$ directly. It was done in the manner shown to indicate that if there were more than two signals, only one signal would be subtracted out of it to meet the requirements of the aforementioned equations. Dividers 580, 581 divide the signals from subtracting means 576 and 577, respectively, with the signal from subtracting means 572 to provide signals to multipliers 583 and 584 respectively. Signal $E_{44}$ is multiplied with the signal from dividers 580 and 581 by multipliers 583 and 584, respectively, to provide signals to switches 575C and 575D, respectively. Signal $E_{44}$ is also applied to a switch 575E, thus switches 575C, 575D and 575E receive three signals corresponding to different values $L_2$, $L'_2$ and $L''_2$.

Similarly the summing means 590, 590A, subtracting means 592, 592A, 596 and 597, dividers 600, 601, and multipliers 603 and 604 cooperate to provide signals corresponding to different values of $G_1$ and $G_2$, thus summing means 509 provides a signal to a switch 575F corresponding to the term $G'_k$ in equation 15 while subtracting means 592 provides a signal to a switch 575G corresponding to the term $G''_k$ in equation 18. Signal $E_{20}$ corresponding to the existing term $G_1$ is applied to a switch 575H. Multipliers 603 and 604 provide signals corresponding to the term $G_j$ in equation 16 to switches 575I and 575J respectively. It should be noted there are two values of $G_j$ from equation 16 depending on which $G_k$ would be used. Signal $E_{21}$ corresponding to the sensed $G_2$ is applied to a switch 575K.

Switches 575 through 575K are controlled by pulse signals $E_{74}$–$E_{79}$ so that in effect there are nine combinations of L and G signals that may be utilized. The relationship of all the pulses are shown in FIGS. 9A through 9J. A profit is then calculated for each combination. For example, signal $E_{74}$ causes switches 575, 575C to pass the signals from summing means 570 and multiplier 583 respectively as signals $E_{83}$ and $E_{84}$. While a pulse $E_{74}$ is in existence, pulse $E_{77}$ is also in existence so that switches 575H and 575K pass signals $E_{20}$ and $E_{21}$, respectively, as signals $E_{85}$ and $E_{86}$, respectively. The occurrence of pulse signals $E_{74}$ through $E_{75}$ will present, at different times, the nine combinations of values for $L_1$, $L_2$, $G_1$ and $G_2$.

Since the values for the $L_1$ and $G_1$ may exceed the limitations defined in inequalities 13 and 17, respectively, comparators 610 and 610A compare signals $E_{83}$ with direct current voltages $V_{15}$ and $V_{16}$ corresponding to upper and lower limits for $L_1$. When signal $E_{83}$ is within those limits comparators 610 and 610A provide high level outputs to an AND gate 611, causing it to provide a high level output to a NOR gate 612. NOR gate 612 provides a signal $E_{79A}$ which controls switch 237 in storage means 235 as hereinbefore explained.

Similarly comparators 610B and 610C receive direct current voltages $V_{17}$ and $V_{18}$, respectively, corresponding to upper and lower limits for $G_1$. When $E_{85}$ is within those limits, comparators 610, 610B provide high level output to NOR gate 612. Should signal $E_{83}$ or signal $E_{85}$ or both of them exceed any of the limits, at least one comparator will provide a low level output causing its corresponding AND gate to provide a low level output to NOR gate 612. NOR gate 612 in turn causes signal $E_{79}$ to go to a high level. As noted previously, when signal $E_{79}$ is at a high level, switch 235 passes voltage $V_{19}$ which corresponds to a substantially zero profit, to comparator 245 so that comparator 245 would not inadvertently enter the current values for signals $E_{83}$ through $E_{86}$ in which at least one of the signals exceeds a limit.

After the completion of a cycle of the operation, that is, profits have been determined for each change in the parameters $L_1$, $L_2$, $G_1$, $G_2$, register 240 contains data corresponding to the maximum profit achieved during that particular cycle of operation. Registers 240C, 240D, 240E and 240F contain the values for $L_1$, $L_2$, $G_1$ and $G_2$ associated with that maximum profit. At the end of the cycle of operations, control signal source 251 provides a pulse $E_{90}$ to registers 240A, 240B, 270B and 270C. Signal $E_{40}$ corresponding to the molar conversion factor $F_1$ has been converted to digital signals by an analog-to-digital converter 238A which are applied to register 240A. The occurrence of pulse $E_{90}$ causes the digital signals to be entered into register 240A. Similarly signal $E_{41}$ is converted to digital signals by converter 238B and entered into register 240B by signal $E_{90}$.

Registers 270 through 270C are connected to registers 240C, 240D, 240E and 240F, respectively and accept the digital signals from those registers upon the occurrence of a pulse $E_{90}$. Registers 240C through 240F and 270 through 270C are utilized so that the control signals provided to the absorber systems can be maintained at a constant value throughout a cycle of operation.

The digital signals from registers 240A, 240B are converted to analog signals $E_{91}$ and $E_{92}$, respectively, and applied to dividers 300 and 301, respectively. Digital-to-analog converters 271, 271A convert digital signals from registers 270 and 270A respectively to analog signals $E_{93}$ and $E_{94}$ respectively, which are provided then to dividers 300 and 301 respectively. Divider 300 divides signal $E_{91}$ by signal $E_{93}$ to provide signal $E_{28}$ to flow recorder controller 45B to adjust its set point accordingly. Similarly divider 301 divides signal $E_{92}$ by signal $E_{94}$ to provide signal $E_{20}$ to flow recorder controller 45C to adjust its set point accordingly.

Flow recorder controllers 45B, 45C provide signals to valves 47B and 47C, respectively, in accordance with the difference between signals $E_{22}$ and the position of the set point of flow recorder controller 45B and signal $E_{23}$ and the set point of the flow recorder 45C, respectively, to control the flow of feed solvent to absorbers 2 and 3 respectively.

Analog to digital converters 271B, 271C convert the digital outputs of registers 270B and 270C respectively to provide $E_{26}$ and $E_{27}$ respectively. As noted before, signal $E_{26}$ is applied to flow recorder controller 45 to adjust its set point so that controller 45 controls valve 47 in accordance with the difference between signal $E_{20}$ and the position of its set points. Similarly signal $E_{27}$ is applied to flow recorder 45A to adjust its set point so that it controls valve 47A in accordance with the difference between signal $E_{21}$ and the position of its set point. Thus flow recorder controllers 45 and 45A control the flow rates of the feed gas to absorbers 2 and 3, respectively, to achieve an optimum feed gas flow rate to those absorbers.

Referring to FIG. 10, there is shown $F_j$ computer 212 whose system operation has hereinbefore been described. Signals $E_8$, $E_9$ and $E_{10}$ are applied to multipliers 310, 310A and 310B respectively, which receives direct current voltages $V_1$, $V_2$ and $V_3$ respectively. Voltage $V_1$, $V_2$ and $V_3$ correspond to the terms $V_{A1}$, $V_{B1}$ and $V_{C1}$ which are the molar volumes of components A, B and C, and which are represented by the general term $V_i$ in the foregoing equations. Signal $E_{32}$ is applied to multipliers 311 and 312, receiving direct current voltages $V_4$, $V_5$, corresponding to the terms $V_s$ and a in the foregoing equations. The output of multipliers 310, 310A, 310B and 311 are summed by summing means 320 to provide a signal to a divider 321. Divider 321 divides the output from multiplier 312 with the signal from summing means 320 to provide signal $E_{40}$. $F_j$ computer 212A operates in a similar manner, using signals $E_{32A}$, $E_{11}$, $E_{12}$ and $E_{13}$ in lieu of signals $E_{32}$, $E_8$, $E_9$ and $E_{10}$ respectively to provide signal $E_{41}$.

Figure 9:
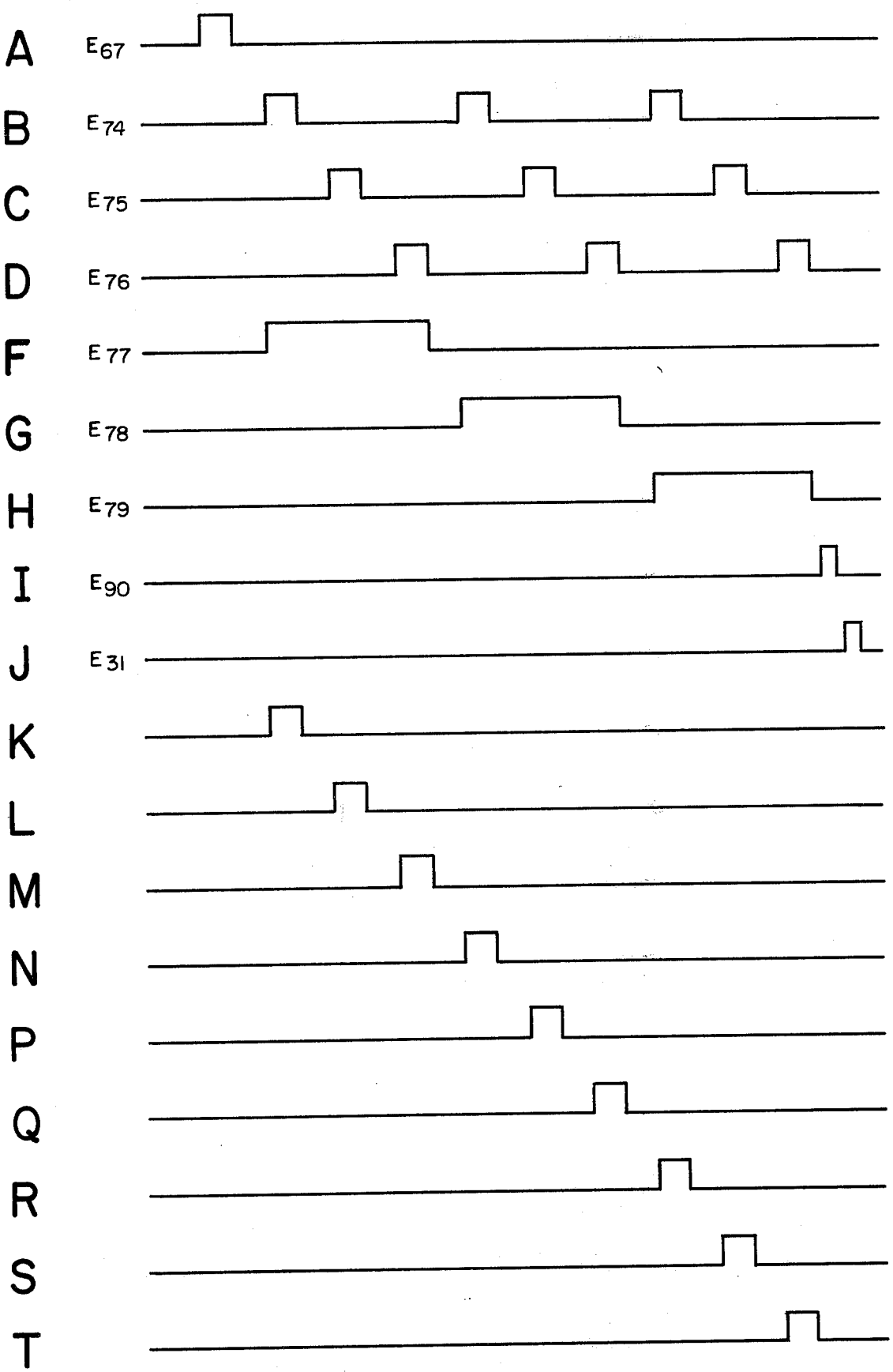
FIGS. 9A through 9T are diagrammatic representations of pulses occurring during the operation of the control system shown in FIG. 1.

Referring now to FIG. 11, control signal source 251 includes a switch 350 receiving a direct current voltage $V_6$. Switch 350 is shown as being manually operated. It should be activated either simultaneously with the activation of switch 63 in programmer means 60, 60A and 60B or within a short time after activation of switches 63 in programmer means 60, 60A and 60B. Once activated, voltage $V_6$ is applied to an AND gate 351 causing it to pass clock pulses from a clock 355 to a counter 360. The count in counter 360 is decoded by a decoder 365 to provide a plurality of signals which will trigger a plurality of one-shot multivibrators 355 causing them to provide pulses as shown in FIGS. 9K through 9T. The pulses shown in FIGS. 9K, 9N and 9R pass through an OR gate 370 to be provided by OR gate 370 as pulse signal $E_{74}$ shown in FIG. 9B. Similarly pulses shown in FIGS. 9I, 9P and 9S pass through an OR gate 370A which provides those pulses as pulse signal $E_{75}$ shown in FIG. 9C. The pulses shown in FIGS. 9M, 9Q and 9T pass through an OR gate 370B which provides those pulses as pulse signal $E_{76}$ shown in FIG. 9D. The pulse shown in FIG. 9K is inverted by an inverter 372 to trigger a flip-flop 373 causing it to provide signal $E_{77}$, shown in FIG. 9F, at a high level. The pulse signal shown in FIG. 9M triggers flip-flop 73 to a clear state causing signal $E_{77}$ to go to a low level so that it has the wave shape and time relationship as that shown in FIG. 9F. Similarly the pulse shown in FIG. 9N is inverted by an inverter 372A to trigger a flip-flop 373A so that signal $E_{78}$ being provided by flip-flop 373A goes to a high level. The pulse shown in FIG. 92 triggers flip-flop 373A to a clear state causing signal $E_{78}$ to go to a low level so that signal $E_{78}$ has the time relationship to other pulses as shown in FIG. 9G. The pulse shown in FIG. 9R is inverted by an inverter 372B to trigger a flip-flop 373B to a set state so that signal $E_{79}$ being provided by flip-flop 373B goes to a high level. The pulse shown in FIG. 9T triggers flip-flop 373B to a clear state causing signal $E_{79}$ to go to a low level so that pulse signal $E_{79}$ has the time relationship to the other pulses as shown in FIG. 9H.

In going to a low level signal $E_{79}$ triggers a one shot multivibrator 375 causing it to provide a pulse signal $E_{90}$ shown in FIG. 9I. As noted previously signal $E_{90}$ enters the values for F, L and G into the appropriate means. Pulse signal $E_{90}$ triggers another one shot multivibrator 377 which acts as a time delay before the pulse provided by one shot 377 triggers yet another one shot 384 causing it to provide the system reset pulse $E_{31}$.

Figure 12:
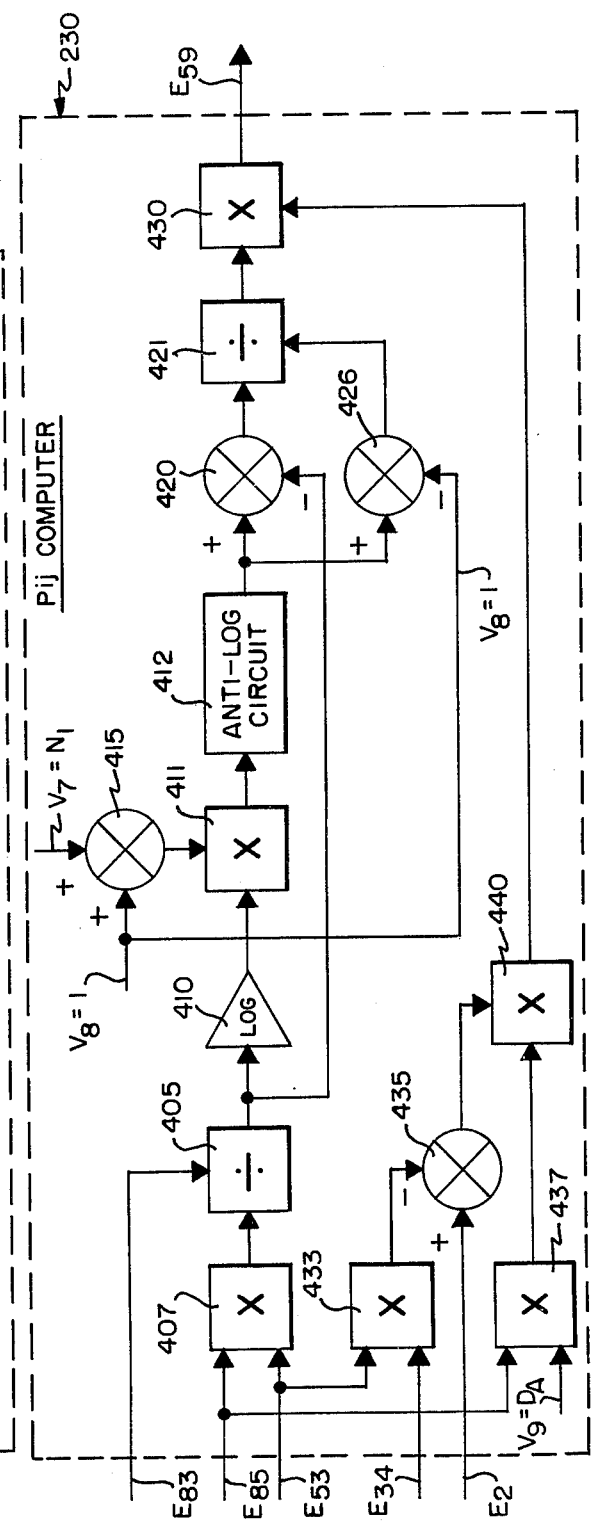
FIGS. 12 and 13 are detailed block diagrams of the $p_{ij}$ computer and the $m_{ij}$ computer, respectively, shown in FIG. 6.

Referring to FIG. 12, $P_{ij}$ computer 230 includes a multiplier 407 which multiples signal $E_{85}$ with signal $E_{53}$. Divider 405 divides signal $E_{83}$ by the signal from multiplier 407 to provide a signal corresponding to the general expression $L_j/m_{ij}G_j$.

The signal from divider 405 is converted to a log signal by a logarithmic amplifier 410 and applied to a multiplier 411. Direct current voltages $V_7$ and $V_8$ corresponding to the term $N_1$ and to the value 1, respectively, are summed by summing means 415. The sum signal is multiplied with the signal from amplifier 410 to provide a signal to an antilog circuit 412. Circuit 412 provides a signal corresponding to the expression $(L_j/m_{ij}G_j)^{N_j+1}$. Subtracting means 420 subtracts the signal provided by divider 405 from the signal from antilog circuit 412 to provide a signal to a divider 421. Subtracting means 426 subtracts voltage $V_8$, corresponding to the value of 1, from the signal from antilog circuit 412 to provide a signal to divider 421. The signal from subtraction means 426 is divided into the signal from subtracting means 420 to provide a signal to multiplier 430 corresponding to $(L_j/m_{ij}G_j)^{N_j+1}$.

A multiplier 433 multiplies signal $E_{53}$ to provide a signal to subtracting means 435. Subtracting means 435 subtracts the signals provided by multiplier 433 from signal $E_2$. Signal $E_{20}$, is multiplied with a direct current voltage $V_9$, corresponding to the economic value of the component A, by a multiplier 437. A multiplier 440 multiplies the signal from subtracting means 435 with the signal from multiplier 437 to provide a signal to multiplier 430. Multiplier 430 multiplies the signals from dividers 421 and multiplier 440 to provide signal $E_{59}$ corresponding to the profit associated with component A processed by absorber 2.

Similarly $P_{ij}$ 230A, 230B, 230C, 230D and 230E operate in a like manner utilizing those signals corresponding to those particular components and absorbers.

Figure 13:
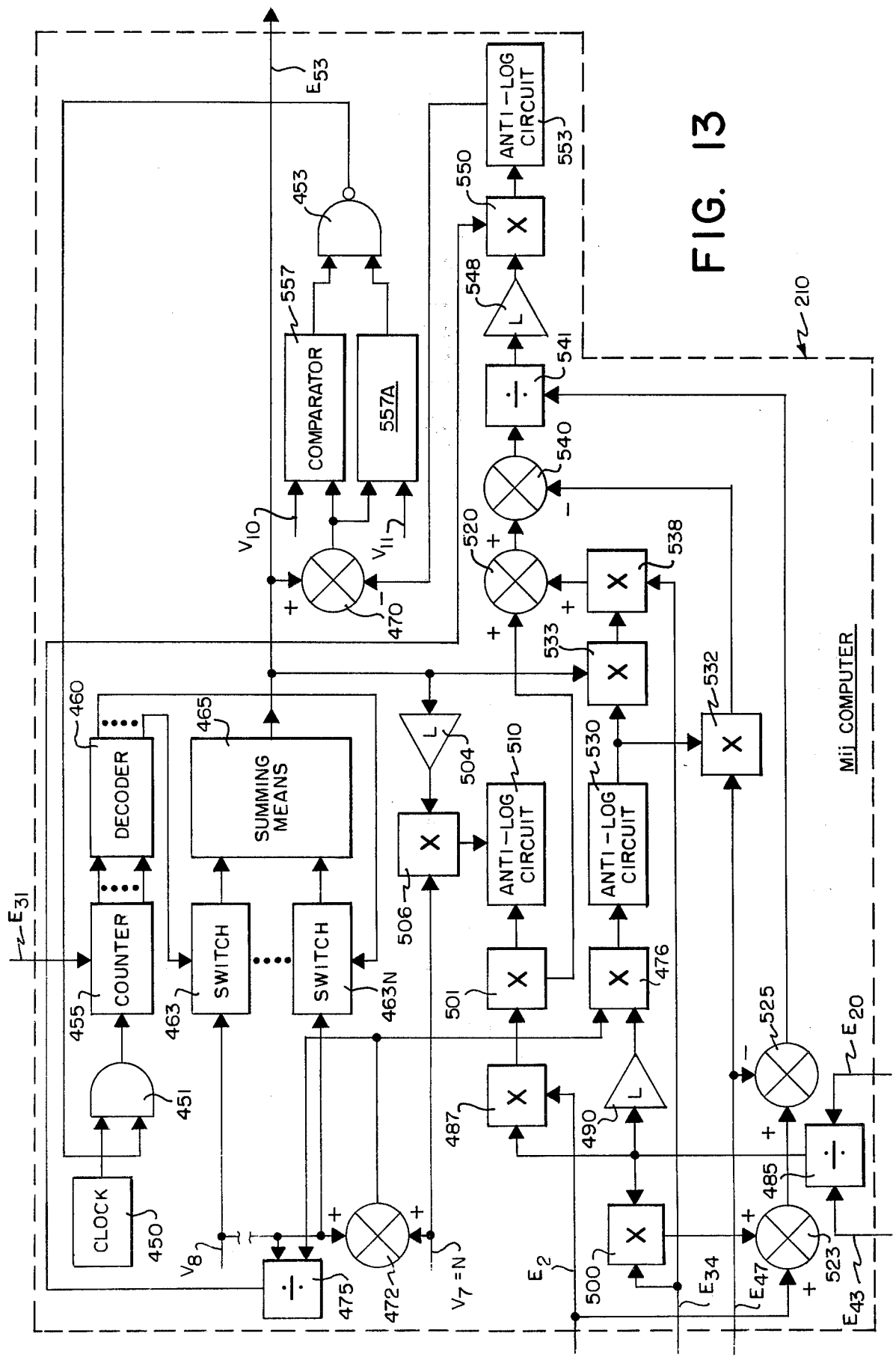

Referring to FIG. 13, there is shown $m_{ij}$ computer 210. $m_{ij}$ computer 210 essentially solves equation 6 for a particular component for a particular absorber which in this case is component A and absorber 2 and provides signal $E_{53}$ corresponding to the term $m_{A1}$. A clock 450 provides clock pulses to an AND gate 451 which receives a high level direct current voltage from a NAND gate 453 initially as hereinafter explained. The high level voltage enables AND gate 451 to pass the clock pulses to a counter 455 to be counted. Counter 455 is reset after each cycle of operation by reset pulse $E_{31}$. A decoder 460 decodes the counter 455 and provides a plurality of control pulses in accordance with the changing count. A plurality of switches 463 through 463N receives direct current voltage $V_8$ corresponding to a value of 1. The outputs of switches 463–463N are applied to summing means 465 which provides signal $E_{53}$. A break in the line designating voltage $V_8$ is shown to indicate that any number of switches 463 may be utilized. The control pulses from the decoder 460 in effect keeps adding 1 to a previous value so as to effectively increase the value of $m_{A1}$ until an equalized condition is achieved thereby meeting the requirements of equation 6. Summing means 465 provides signal $E_{53}$ to subtracting means 470 receiving a signal corresponding to the right side of equation 6 as hereinafter explained.

Summing means 472 sums voltages $V_7$, $V_8$ to provide a signal corresponding to the general term $N_j+1$ to a divider 475 and to a multiplier 476. Divider 475 divides voltage $V_8$ with the signal from summing means 472 to provide a signal corresponding to the general term $$\frac{1}{N_j+1}$$

in equation 6. Signals $E_{43}$ and $E_{20}$ are applied to a divider 485. Signal $E_{43}$ is divided by signal $E_{20}$ by a divider 485 to provide a signal corresponding to the general term $L_j/G_j$, to multiplier 487, a logarithmic amplifier 490 and a multiplier 500. Multiplier 487 multiplies signal $E_2$ with the signal from divider 485 to provide a signal to another multiplier 501. Signal $E_{53}$ is converted to a logarithm signal by a logarithmic amplifier 504 to provide a signal to a multiplier 506. Multiplier 506 multiplies voltage $V_7$ with the signal signal from log amplifier 504 to provide a signal to an antilog circuit 510 which provides a signal corresponding to the general term $(m_{ij})^{N_j}$. The signal from circuit 510 is applied to multiplier 501 where it is multiplied with a signal from multiplier 487 to provide a signal to summing means 520.

Multiplier 500 multiplies signal $E_{34}$ with the signal from divider 485 to provide a signal to summing means 523. Subtracting means 525 subtracts signal $E_{47}$ from the signal provided by summing means 523 to provide a signal corresponding to the general term $$Y_{ij} + X_{ij}(L_j/G_j) - Z_{ij}$$

Multiplier 476 multiplies the output of logarithmic amplifier 490 with the output of summing means 472 to provide a signal to an antilog circuit 530. Antilog circuit 530 provides a signal corresponding to the general term $(L_j/G_j)^{N_j+1}$ to multipliers 532, 533. Multiplier 533 multiplies the signal from antilog circuit 530 with signal $E_{53}$ to provide a signal to another multiplier 538. Multiplier 538 multiplies signal $E_{34}$ with the signal from multiplier 533 to provide a signal to summing means 520.

Signal $E_{47}$ is multiplied with the signal from antilog circuit 530 by multiplier 532 to provide a signal to subtracting means 540 where it is subtracted from the signal provided by summing means 520. A divider 541 divides the signal from subtracting means 540 by the signal from subtracting means 525 to provide a signal to a logarithmic amplifier 548. A multiplier 550 multiplies the output from logarithmic amplifier 548 with the signal from divider 475 to provide a signal to an antilog circuit 553. The signal provided by antilog circuit 553 corresponds to right side of equation 6 and is provided to subtracting means 470. When signal $E_{53}$ corresponds to the correct value for $m_{ij}$ the signal from subtracting means 470 is substantially zero. The signal from means 470 is applied to comparators 557, 557A receiving direct current voltages $V_{10}$ and $V_{11}$, respectively. Voltages $V_{10}$ and $V_{11}$ correspond to limits defining a substantially zero condition for $m_{ij}$. When the signal from the subtracting means 470 is not within those limits, a comparator 557 or 557A will provide a low level signal to NAND gate 453 while the other comparator provides a high level signal to NAND gate 453. NAND gate 453 receiving one high level signal and one low level signal provides a high level output to AND gate 451. When the signal from subtracting means 470 is within the limits, comparators 557, 557A provide high level signals to NAND gate 453 causing it to provide a low level output to AND gate 451. The low level output disables AND gate 451 thereby stopping the counting by counter 455 so that signal $E_{53}$ remains at the correct value for $m_{A1}$.

The apparatus of the present invention as hereinbefore described controls two or more absorbers in an absorber system to obtain an optimum operation of the absorber system. The control system monitors the feed solvent, the feed gas and the effluent gas to the absorber system and uses the monitored values to control the feed solvent and the feed gas to achieve an optimum operating condition.

What is claimed is:

1. A system for controlling an absorber system having two or more absorbers, each absorber receives feed gas and feed solvent and provides effluent gas and effluent solvent, comprising means for monitoring the feed solvents, the feed gases to the absorbers and the effluent gases from the absorbers and providing signals corresponding to quantities of components in the feed solvent, quantities of the components in the effluent gas and quantities of the components in the feed gas and to the flow rates of the feed solvents, of the feed gases and of the effluent gases means for controlling the flow rates of the feed solvent and the feed gas to each absorber and of the effluent gas from each absorber in accordance with control signals, means for providing signals corresponding to the economic values of the components, and means connected to the monitoring means, to the economic signal means and to control means for providing the control signals to the control means in accordance with signals from the monitoring means and from the economic signal means so as to control the flow rates of the effluent gases, the feed gases and the feed solvents to achieve an optimum operating condition for the absorber system.

2. A system as described in claim 1 in which the monitoring means includes chromatograph signal means sampling the effluent gases, the feed gases and the feed solvents and providing signals corresponding to mole fractions of the components in the effluent gases, to mole fractions of the components in the feed solvents and to moles of the components in the feed gas to each absorber per mole of feed gas to that absorber; and sensors sensing the flow rates of the feed solvents, the feed gases and the effluent gases and providing signal corresponding thereto.

3. A system as described in claim 2 in which the control signal means includes X and Z signal means receiving signals from the flow rate sensors and from the chromatograph signal means for providing $X_{ij}$ signals, with each $X_{ij}$ signal corresponding to the moles of a different component in the feed solvent to a different absorber per mole of component-free solvent to the absorber, and $Z_{ij}$ signals, where each $Z_{ij}$ signal corresponds to moles of a different component in the effluent gas from a different absorber per mole of feed gas to the absorber in accordance with the received signals; means receiving signals provided by the gas chromatograph means for providing signals corresponding to a molar conversion factor $F_j$ for each absorber in accordance with the received signals; multiplier means connected to the $F_j$ signal means and to the flow rate sensors for providing signals, each signal $L_j$ corresponds to the moles of component-free solvent to a different absorber per unit time in accordance with the feed solvent flow rate signals and the $F_j$ signals; means for providing control pulses; L and G signal means connected to the control pulse means, to the multiplier means and to the flow rate sensors for providing L and G signals in accordance with the signals from the multiplier means and the flow rate signal and as controlled by the control pulse so that each L signal at different time intervals corresponds to the determined number of moles of component-free solvent per unit time entering a different absorber, to a number of moles, more than the determined number, of the component-free solvent per unit time for that absorber and to a number of moles, less than the determined number, of the component-free solvent per unit time for that absorber, and each G signal at different time intervals corresponds to a sensed flow rate of feed gas to a different absorber, to a calculated feed gas flow rate for that absorber which is greater than sensed flow rate and to a calculated feed gas flow rate for that absorber which is less than the sensed flow rate; profit signal means connected to the X and Z signal means, to the multiplier means, to the flow rate sensors and to L and G signal means for calculating the profit of the absorber system for the different values of the L and G signals in accordance with the signals from the L and G signal means, the X and Z signal means, the flow rate sensors and the multiplier means and providing a profit signal corresponding to the calculated profits, and storage means connected to $F_j$ signal means, to the profit signal means, to the L and G signal means and to the control pulse means for storing the profit signal when the profit signal corresponds to a profit greater than a previous profit and for storing the values of L and G signals associated with the stored profit signal so that after the L and G signals have changed through the different combinations of values for the L and G signals so that the stored profit signal in the storage means corresponds to a maximum profit for the various values of L and G signals and the storage means provides control signals in accordance with the L and G signal values associated with the stored profit signal, and the $F_j$ signals.

4. A system as described in claim 3 in which the L and G signal means includes $L_1'$ signal means connected to the multiplier means for providing a signal corresponding to the number $L_1'$ of moles of component-free solvent per unit entering an absorber which is greater than the determined number $L_1$ of moles in accordance with one of the signals from the multiplier means and the following equation:

$$L_1' = L_1 + \Delta L$$

where $\Delta L$ is a predetermined change in the number of moles of component-free solvent per unit time entering the absorber, $L_1''$ signal means connected to the multiplier means for providing a signal corresponding to the number $L_1''$ of moles of component-free solvent per unit time entering the absorber which is less than the determined number $L_1$ in accordance with the one signal from the multiplier means and the following equation $$L_1'' = L_1 - \Delta L,$$

$L_2'$ signal means connected to the multiplier means and to the $L_1'$ signal means for providing at least one signal corresponding to a number $L_2'$ of moles of component-free solvent per unit time entering another absorber which is greater than the determined number $L_2$ of moles entering that absorber in accordance with the signals from the multiplier means, the $L_1'$ signal and the following equation $$L_2' = \frac{(L_T - L_1)}{(L_T - L_1')} L_2$$

where $L_T$ is the total determined number of moles of component-free solvent entering the absorber system $L''$ signal means connected to the multiplier means and to the $L_1''$ signal means for providing at least one signal corresponding to a number $L_2''$ of moles of component-free solvent per unit time entering the other absorber which is less than the determined number $L_2$ of moles entering that absorber in accordance with the signals from the multiplier means, the $L_1''$ signal and the following equation $$L_2'' = \frac{(L_T - L_1)}{(L_T - L_1'')} L_2$$

and first switching means connected to the control pulse means, to the multiplier means and to the $L_1'$, $L_1''$, $L'$ and $L''$ signal means for passing the signals from the multiplier means as the L signals when a first control pulse occurs and blocking the signals from the multiplier means when the first control pulse does not occur, for passing the signals from the $L_1'$ signal means and from the $L'$ signal means as the L signals when a second control pulse occurs and blocking the signals from the $L_1'$ signal means and the $L'$ signal means when the second control pulse does not occur, and for passing the signals from the $L_1''$ signal means and from the $L''$ signal means as the L signals when a third control pulse occurs and blocking the signals from the $L_1''$ signal means and the $L''$ signal means when the third control pulse does not occur.

5. A system as described in claim 4 in which the L and G signal means includes $G'$ signal means connected to the flow rate sensors for providing a signal corresponding to a flow rate $G_1'$ of feed gas entering an absorber which is greater than the sensed flow rate $G_1$ of the feed gas entering that absorber in accordance with one of the flow rate signals from the flow rate sensors and the following equation $$G_1' = G_1 + \Delta G$$

where $\Delta G$ is a predetermined change in the feed gas flow rate entering that absorber, $G_1''$ signal means connected to the flow rate sensors for providing a signal corresponding to a flow rate $G_1''$ of feed gas entering the absorber which is less than the sensed flow rate $G_1$ of the feed gas entering the absorber in accordance with the one flow rate signal from the flow rate sensors and the following equation $$G_1'' = G_1 - \Delta G$$

$G'$ signal means connected to the flow rate sensors and to the $G_1'$ signal means for providing at least one signal corresponding to a flow rate $G_2'$ of feed gas entering another absorber which is greater than the sensed flow rate $G_1$ entering that absorber in accordance with the feed gases flow rate signals, the $G_1'$ signal and the following equation $$G_2' = \frac{(G_T - G_1)}{(G_T - G_1')} G_2$$

where $G_T$ is the total flow rate of feed gas to the absorber system, $G''$ signal means connected to the flow rate sensors and to the $L_1''$ signal means for providing at least one signal corresponding to a flow rate $G_2''$ of feed gas entering the other absorber which is less than the sensed flow rate $G_2$ of feed gas entering that absorber in accordance with the feed gases flow rate signals from the flow rate sensors, the $G_1''$ signal and the following equation $$G_2'' = \frac{(G_T - G_1)}{(G_T - G_1'')} G_2$$

and second switching means connected to the control pulse means, to the flow rate sensors and to the $G_1'$, $G_1''$, $G'$ and $G''$ signal means for passing the feed gases flow rate signals from the flow sensors as the G signals when a fourth control pulse occurs and blocking the feed gases flow rate signals from the flow rate sensors when the fourth control pulse does not occur, for passing the signals from the $G_1'$ signal means and from the $G'$ signal means as the G signals when a fifth control pulse occurs and blocking the signals from the $G_1'$ signal means and the $G'$ signal means when the fifth control pulse does not occur, and for passing the signals from the $G_1''$ signal means and from the $G''$ signal means as the G signals when a sixth control pulse occurs and blocking the signals from the $G_1''$ signal means and the $G''$ signal means when the sixth control pulse does not occur.

6. A system as described in claim 5 in which the profit signal means includes $m_{ij}$ computing means connected to the chromatograph signal means, to the flow rate sensors, to the control pulse means, to the $F_j$ signal means, and to the X and Z signal means for providing signals, each signal corresponds to an equilibrium slope factor $m_{ij}$ for a different component in a different absorber, computing means connected to the $m_{ij}$ computing means, to the economic value signal means, to the L and G signal means, to the X and Y signal means and to the chromatograph signal means for providing a plurality of signals, each signal corresponding to an individual profit $p_{ij}$ associated with a different component in a different absorber, each individual profit signal varying in accordance with the changes in the L and G signals from the L and G signal means; means for summing the individual profit signals from the individual profit signal means for providing the profit signal to the storage means.

7. A control system as described in claim 6 in which each individual profit signal means provides its individual profit signal in accordance with the following equation $$p_{ij} = D_i G_j (Y_{ij} - m_{ij} X_{ij}) \left[ \frac{(L_j/m_{ij}G_j)^{N_j+1} - (L_j/m_{ij}G_j)}{(L_j/m_{ij}G_j)^{N_j+1} - 1} \right]$$

where $D_i$ corresponds to the economic value of a component, $G_j$ is the flow rate of feed gas entering an absorber, $Y_{ij}$ corresponds to moles of the component in the feed gas entering the absorber per mole of the feed gas entering the absorber, $X_{ij}$ corresponds to moles of the component in the feed solvent entering the absorber per mole of component-free solvent entering the absorber, $L_j$ corresponds to the moles of component-free solvent to the absorber per unit time and $N_j$ corresponds to the number of plates in the absorber.

8. A system as described in claim 7 in which the $m_{ij}$ signal means provides each $m_{ij}$ signal in accordance with the following equation $$m_{ij} = \frac{Y_{ij}\left(\frac{L_j}{G_j}\right)(m_{ij})^{N_j} + X_{ij}\left(\frac{L_j}{G_j}\right)^{N_j+1}(m_{ij}) - Z_{ij}\left(\frac{L_j}{G_j}\right)^{N_j+1}}{Y_{ij} + X_{ij}\left(\frac{L_j}{G_j}\right) - Z_{ij}}^{\frac{1}{N_j+1}}$$

where $Z_{ij}$ corresponds to the moles of a component in the effluent gas leaving an absorber per mole of the feed gas entering the absorber.

9. A system as described in claim 8 in which the X and Z signal means provide each X signal in accordance with the following equation $$X_{ij} = \frac{x_{ij}}{s_j}$$

where $x_{ij}$ corresponds to the mole fraction of a component in the feed solvent entering an absorber and $s_j$ is the mole fraction of component-free solvent in the feed solvent entering the absorber.

10. A system as described in claim 9 in which the X and Z signal means provide each $Z_{ij}$ signal in accordance with the following equation $$Z_{ij} = \frac{z_{ij}H_{ij}}{G_j}$$

where $z_{ij}$ corresponds to the mole fraction of a component in effluent gas leaving an absorber and $H_j$ corresponds to moles of effluent gas leaving the absorber per unit time.

11. A system as described in claim 10 in which the control pulse means includes a control pulse network which provides the first through sixth pulses in a manner so that the fourth, fifth and sixth control pulses occur at different times, and the first, second and third pulses occur at different times with respect to each other but during the time interval for each fourth, fifth and sixth control pulse.

12. A system as described in claim 11 in which the control pulse means includes means for periodically providing a reset pulse to the chromatograph means and to the control pulse network so as to periodically recycle the optimizing operation.

13. A system as described in claim 12 in which the control pulse means includes means for providing an "enter" pulse just prior to the occurrence of a reset pulse; and the storage means includes third switching means receiving L and G signals from the L and G signal means, the profit signal from the profit signal means and a direct current voltage corresponding to a substantial zero profit condition and controlled by the L and G signals from the L and G signal means for passing a profit signal from the profit signal means when the L and G values are within the predetermined limits while blocking the direct current voltage and for blocking the profit signal from the profit signal means when an L or G value is not within the predetermined limits while passing the direct current voltage, a plurality of analog-to-digital converters for the L and G signals, the passed signal from the seventh switching means converts the received signals to corresponding digital signals, first register means connected to the plurality of analog-to-digital converters and controlled by a "store" pulse to store the digital signals provided by the plurality of converters and providing digital signals corresponding to the stored digital signals; comparator means receiving the passed signal from the seventh switching means and an analog signal corresponding to the stored profit signal for providing the "store" pulse when the passed signal from the seventh switching means is greater than the analog signal corresponding to the stored profit so as to control the register means to enter the digital signals corresponding to the greater profit and to the values of L and G associated with the greater profit in the first register means.

14. A system as described in claim 13 in which the storage means also includes a second plurality of analog-to-digital converters receiving the $F_j$ signals, second register means connected to the last-mentioned analog-to-digital converters, to the first register means and to the "enter" pulse means in the control pulse means for storing the digital signals from the last-mentioned analog-to-digital converters and the L and G digital signals from the first register means in response to an "enter" pulse from the "enter" pulse means, a second plurality of digital-to-analog converters connected to the second register means for providing analog signals corresponding to the digital signals provided by the second register means, divider means connected to the last-mentioned digital-to-analog converters for dividing the analog signals corresponding to the $F_j$ factors with the signals corresponding to the stored values for L associated with the maximum profit to provide control signals to the control means while the digital-to-analog converters provide signals corresponding to the stored values of G associated with the maximum profit as control signals to the control means so that the control signals may change once during each cycle of operation.

* * * * *

UNITED STATES PATENT AND TRADEMARK OFFICE
CERTIFICATE OF CORRECTION

PATENT NO. : 3,917,931
DATED : NOVEMBER 4, 1975
INVENTOR(S) : DONALD E. SWEENEY, JR.

It is certified that error appears in the above-identified patent and that said Letters Patent are hereby corrected as shown below:

COL. 18, Claim 7, line 33:

$$``P_{ij} = D_i G_j (Y_{ij} - m_{ij} X_{ij}) \left[ \frac{(L_j/m_{ij} G_j)}{N_j + 1 - (L_j/m_{ij} G_j)^{N_j-1} - 1} \right]''$$

should read:

$$-- P_{ij} = D_i G_j (Y_{ij} - m_{ij} X_{ij}) \left[ \frac{(L_j/m_{ij} G_j)^{N_j+1} - (L_j/m_{ij} G_j)}{(L_j/m_{ij} G_j)^{N_j+1} - 1} \right] --$$

Signed and Sealed this

Twenty-fourth Day of August 1976

[SEAL]

Attest:

RUTH C. MASON
*Attesting Officer*

C. MARSHALL DANN
*Commissioner of Patents and Trademarks*